US011647494B2

(12) United States Patent
Zhu et al.

(10) Patent No.: US 11,647,494 B2
(45) Date of Patent: May 9, 2023

(54) TECHNIQUES FOR DYNAMICALLY PAIRING BEAMS

(71) Applicant: QUALCOMM Incorporated, San Diego, CA (US)

(72) Inventors: Jun Zhu, San Diego, CA (US); Mihir Vijay Laghate, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 17/195,367

(22) Filed: Mar. 8, 2021

(65) Prior Publication Data

US 2022/0287017 A1 Sep. 8, 2022

(51) Int. Cl.
*H04W 72/04* (2023.01)
*H04W 72/044* (2023.01)
*H04W 72/02* (2009.01)

(52) U.S. Cl.
CPC ......... *H04W 72/046* (2013.01); *H04W 72/02* (2013.01); *H04W 72/042* (2013.01)

(58) Field of Classification Search
CPC . H04W 72/046; H04W 72/02; H04W 72/042; H04B 7/0617; H04B 7/08
See application file for complete search history.

(56) References Cited

U.S. PATENT DOCUMENTS

2006/0035605 A1* 2/2006 Ozluturk .................. H04B 7/10 455/101
2013/0230088 A1* 9/2013 Arad .................... H04B 7/0413 375/228
2016/0365900 A1 12/2016 Kim et al.
2017/0055281 A1* 2/2017 Islam .................... H04L 5/0053
2021/0152219 A1* 5/2021 Rusek .................. H04B 7/0408

FOREIGN PATENT DOCUMENTS

WO WO-2019195047 A1 10/2019

OTHER PUBLICATIONS

International Search Report and Written Opinion—PCT/US2022/015672—ISA/EPO—dated May 20, 2022 (206579WO).

* cited by examiner

*Primary Examiner* — Kiet Tang
(74) *Attorney, Agent, or Firm* — Holland & Hart LLP

(57) ABSTRACT

Methods, systems, and devices for wireless communications are described. A user equipment (UE) may communicate with a base station using a first beam set of a group of beam sets, where each beam set includes a beam from a first set of beams with a first polarization and a beam from a second set of beams with a second polarization. The UE may receive a set of reference signals corresponding to a set of transmit beams of the base station, where the UE receives at least one reference signal for each beam of the first and second sets of beams. The UE may select a second beam set from the group of beam sets based on one or more parameters associated with the second beam set and based on receiving the set of reference signals, and may communicate with the base station using the selected beam set.

28 Claims, 10 Drawing Sheets

200

TECHNIQUES FOR DYNAMICALLY PAIRING BEAMS

FIELD OF TECHNOLOGY

The present disclosure relates to wireless communications, including techniques for dynamically pairing beams.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may communicate using beam sets (e.g., beam pairs) which are generated using beams associated with different polarizations. For example, in the context of rank-2 communications, a UE may communicate using beam pairs, where each beam pair includes a first beam with a first polarization (e.g., vertical polarization) and a second beam with a second polarization (e.g., horizontal polarization). However, beam selection techniques used by some UEs may result in performance imbalances between beams of a beam set, thereby reducing throughput and reliability of wireless communications.

SUMMARY

The described techniques relate to improved methods, systems, devices, and apparatuses that support techniques for dynamically pairing beams. Generally, the present disclosure provides techniques for dynamically selecting beam sets including a first set of beams having a first polarization (e.g., horizontally-polarized beams (e.g., 1H, 2H, 3H, etc.)) and a second set of beams having a second polarization (e.g., vertically-polarized beams (e.g., 1V, 2V, 3V, etc.)) for wireless communications at a user equipment (UE). For example, a base station may perform beam management procedure (e.g., a P1-P2-P3 procedure, and in some examples specifically for P1) during which the base station transmits reference signals using different transmit beams within different time intervals (e.g., slots). During each of the time intervals, a UE may cycle through different beams (e.g., different beams of beam sets or beam pairs), and may perform measurements on the reference signals received using each beam. As such, the UE may cycle through different combinations of polarized beams (e.g., vertically-polarized and horizontally-polarized beams) to determine a beam set (e.g., beam set including a vertically-polarized beam and a horizontally-polarized beam) which exhibits the best performance for each respective transmit beam of the base station. For instance, the UE may determine a first beam set (e.g., 1H4V) exhibits the highest performance/quality for receiving communications from a first transmit beam (e.g., Tx1) of the base station (e.g., because 1H and 4V are closely balanced), and may determine a second beam set (e.g., 3H2V) exhibits the highest performance/quality for receiving communications from a second transmit beam (e.g., Tx2) of the base station. Subsequently, the UE may select a beam set (e.g., beam pair), and may communicate with the base station using the selected beam set.

A method for wireless communication at a UE is described. The method may include communicating with a base station using a first beam set of a set of multiple beam sets of the UE, each beam set of the set of multiple beam sets including a beam from a first set of multiple beams associated with a first polarization and a beam from a second set of multiple beams associated with a second polarization different than the first polarization, receiving a set of multiple reference signals in a set of multiple time intervals corresponding to a set of multiple transmit beams of the base station, where, for each beam of the first set of multiple beams and the second set of multiple beams, the UE receives at least one reference signal of the set of multiple reference signals in a time interval of the set of multiple time intervals, selecting a second beam set from the set of multiple beam sets based on one or more parameters associated with the second beam set and based on receiving the set of multiple reference signals, and communicating with the base station using the selected second beam set.

An apparatus for wireless communication at a UE is described. The apparatus may include a processor, memory coupled with the processor, and instructions stored in the memory. The instructions may be executable by the processor to cause the apparatus to communicate with a base station using a first beam set of a set of multiple beam sets of the UE, each beam set of the set of multiple beam sets including a beam from a first set of multiple beams associated with a first polarization and a beam from a second set of multiple beams associated with a second polarization different than the first polarization, receive a set of multiple reference signals in a set of multiple time intervals corresponding to a set of multiple transmit beams of the base station, where, for each beam of the first set of multiple beams and the second set of multiple beams, the UE receives at least one reference signal of the set of multiple reference signals in a time interval of the set of multiple time intervals, select a second beam set from the set of multiple beam sets based on one or more parameters associated with the second beam set and based on receiving the set of multiple reference signals, and communicate with the base station using the selected second beam set.

Another apparatus for wireless communication at a UE is described. The apparatus may include means for communicating with a base station using a first beam set of a set of multiple beam sets of the UE, each beam set of the set of multiple beam sets including a beam from a first set of multiple beams associated with a first polarization and a beam from a second set of multiple beams associated with a second polarization different than the first polarization, means for receiving a set of multiple reference signals in a set of multiple time intervals corresponding to a set of multiple transmit beams of the base station, where, for each beam of the first set of multiple beams and the second set of multiple beams, the UE receives at least one reference signal of the set of multiple reference signals in a time interval of the set of multiple time intervals, means for selecting a second beam set from the set of multiple beam sets based on one or more parameters associated with the second beam set and based on receiving the set of multiple reference signals, and means for communicating with the base station using the selected second beam set.

A non-transitory computer-readable medium storing code for wireless communication at a UE is described. The code may include instructions executable by a processor to communicate with a base station using a first beam set of a set of multiple beam sets of the UE, each beam set of the set of multiple beam sets including a beam from a first set of multiple beams associated with a first polarization and a beam from a second set of multiple beams associated with a second polarization different than the first polarization, receive a set of multiple reference signals in a set of multiple time intervals corresponding to a set of multiple transmit beams of the base station, where, for each beam of the first set of multiple beams and the second set of multiple beams, the UE receives at least one reference signal of the set of multiple reference signals in a time interval of the set of multiple time intervals, select a second beam set from the set of multiple beam sets based on one or more parameters associated with the second beam set and based on receiving the set of multiple reference signals, and communicate with the base station using the selected second beam set.

Some examples of the method, apparatuses, and non-transitory computer-readable medium described herein may further include operations, features, means, or instructions for transmitting, to the base station, a reporting message including an indication of the second beam set, where communicating with the base station using the second beam set may be based on transmitting the reporting message.

In some examples of the method, apparatuses, and non-transitory computer-readable medium described herein, selecting the second beam set from the set of multiple beam sets may include operations, features, means, or instructions for selecting a first beam from the first set of multiple beams based on one or more parameters associated with the first beam and selecting a second beam from the second set of multiple beams based on one or more parameters associated with the second beam, where the second beam set includes the first beam and the second beam.

In some examples of the method, apparatuses, and non-transitory computer-readable medium described herein, selecting the first beam and the second beam may include operations, features, means, or instructions for selecting the first beam based on the one or more parameters associated with the first beam satisfying a first threshold and selecting the second beam based on the one or more parameters associated with the second beam satisfying the first threshold, a second threshold, or both.

In some examples of the method, apparatuses, and non-transitory computer-readable medium described herein, selecting the first beam and the second beam may include operations, features, means, or instructions for selecting the first beam based on the first beam having a highest quality out of each beam of the first set of multiple beams and selecting the second beam based on the second beam having a highest quality out of each beam of the second set of multiple beams.

In some examples of the method, apparatuses, and non-transitory computer-readable medium described herein, the one or more parameters associated with the first beam, the one or more parameters associated with the second beam, or both, include a reference signal received power (RSRP) measurement, a reference signal received quality (RSRQ) measurement, a signal-to-noise ratio (SNR), or any combination thereof.

Some examples of the method, apparatuses, and non-transitory computer-readable medium described herein may further include operations, features, means, or instructions for performing measurements for the set of multiple reference signals received in the set of multiple time intervals, where the selecting may be based on the measurements.

Some examples of the method, apparatuses, and non-transitory computer-readable medium described herein may further include operations, features, means, or instructions for determining a quality of communications performed using the second beam set may be less than or equal to a threshold quality, selecting a third beam set from the set of multiple beam sets based on the quality of communications performed using the second beam set being less than or equal to the threshold quality, and communicating with the base station using the third beam set.

In some examples of the method, apparatuses, and non-transitory computer-readable medium described herein, communicating with the base station using the second beam set may include operations, features, means, or instructions for transmitting an uplink message to the base station using the second beam set.

In some examples of the method, apparatuses, and non-transitory computer-readable medium described herein, communicating with the base station using the second beam set may include operations, features, means, or instructions for receiving a downlink message from the base station using the second beam set.

In some examples of the method, apparatuses, and non-transitory computer-readable medium described herein, the first polarization includes a vertical polarization and the second polarization includes a horizontal polarization.

DETAILED DESCRIPTION

Figure 1:
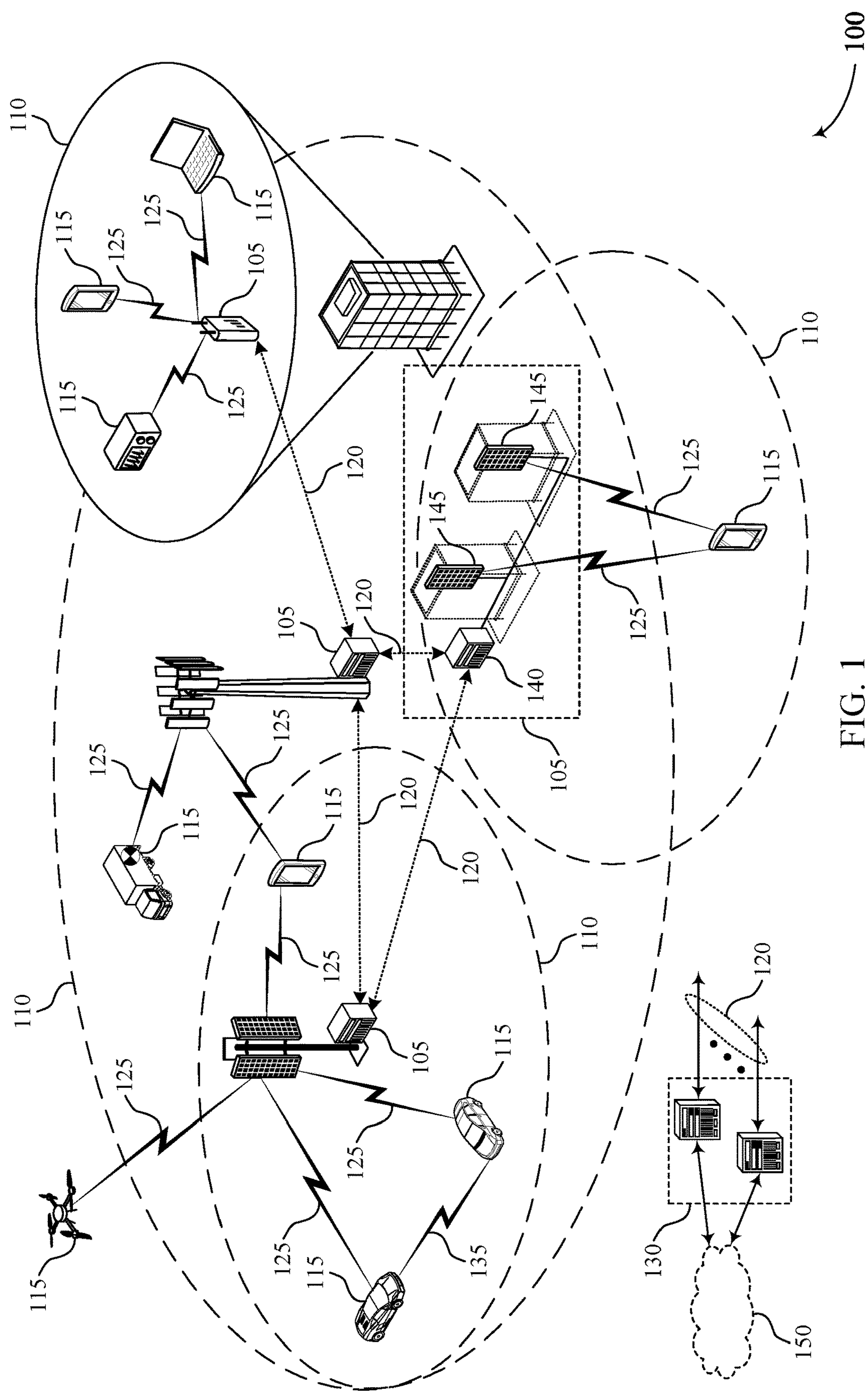
FIG. 1 illustrates an example of a wireless communications system that supports techniques for dynamically pairing beams in accordance with aspects of the present disclosure.

In some cases, a user equipment (UE) may communicate using beam sets (e.g., beam pairs) which are generated using beams associated with different polarizations. For example, in the context of rank-2 communications, a UE may communicate using beam pairs, where each beam pair includes a first beam with a first polarization (e.g., vertical polarization) and a second beam with a second polarization (e.g., horizontal polarization). Some UEs may select (e.g., statically select, for example upon power on, attachment, reattachment, handover, etc.) beam sets (e.g., beam pairs) which will be used for communications with a base station. For example, a UE may determine that a first beam pair (e.g., 1H1V beam pair) will be used to receive downlink messages transmitted by the base station using a first transmit beam (e.g., Tx1), and may determine that a second beam pair (e.g., 2H2V beam pair) will be used to receive downlink messages transmitted by the base station using a second transmit beam (e.g., Tx2). However, statically selecting beam sets (beam pairs) may result in a degradation of wireless communications as the UE moves relative to the base station. Moreover, the channel for each respective beam (e.g., horizontal beam and vertical beam) of each beam pair may be different. As such, differing channel conditions for the beams of each beam pair may lead to an imbalance of performance between beams of each beam pair, thereby reducing a throughput and reliability of rank-2 communications. Differing channel conditions between beams may similarly affect a throughput and reliability of higher-rank communications (e.g., rank-4 or higher communications).

Accordingly, techniques for dynamically selecting beam sets (e.g., beam pairs) for wireless communications at a UE are described. In particular, aspects of the present disclosure provide techniques for dynamically selecting beam sets including horizontally-polarized beams (e.g., 1H, 2H, 3H, etc.) and vertically-polarized beams (e.g., 1V, 2V, 3V, etc.). For the purposes of the present disclosure, the term "beam set" may be used to refer to a set of two or more beams. In this regard, a beam set may include two beams, three beams, four beams, and the like.

For example, a base station may perform beam management procedure (e.g., P1-P2-P3 procedure, specifically for P1) during which the base station transmits reference signals using different transmit beams within different time intervals (e.g., slots). During each of the time intervals, a UE may cycle through different beams (e.g., different beams of beam pairs), and may perform measurements on the reference signals received using each beam. As such, the UE may cycle through different combinations of polarized beams (e.g., vertically-polarized and horizontally-polarized beams) to determine a beam set (e.g., beam set including a vertically-polarized beam and a horizontally-polarized beam) which exhibits the best performance for each respective transmit beam of the base station. For instance, the UE may determine a first beam pair (e.g., 1H4V) exhibits the highest performance/quality for receiving communications from a first transmit beam (e.g., Tx1) of the base station (e.g., because 1H and 4V are closely balanced), and may determine a second beam pair (e.g., 3H2V) exhibits the highest performance/quality for receiving communications from a second transmit beam (e.g., Tx2) of the base station. Subsequently, the UE may select a beam set (beam pair), and may communicate with the base station using the selected beam set.

In some aspects, the UE may re-select beam sets based on determining a quality of communications performed using the selected beam set falls below some threshold quality. By dynamically selecting individual beams for each beam set (e.g., each beam pair), techniques described herein may reduce a performance imbalance between beams of different polarizations (e.g., between horizontally-polarized beams and vertically-polarized beams) within each beam set, which may improve a throughput and reliability of rank-2 and higher-rank communications (e.g., rank-4 communications).

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for dynamically pairing beams.

FIG. 1 illustrates an example of a wireless communications system 100 that supports techniques for dynamically pairing beams in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), highest signal-to-interference-plus-noise ratio (SINR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 of the wireless communications system 100 may be configured to support techniques for dynamically selecting beam sets (e.g., beam pairs) for wireless communications at the UEs 115. In particular, the UEs 115 of the wireless communications system 100 may support techniques for dynamically selecting beam sets including horizontally-polarized beams (e.g., 1H, 2H, 3H, etc.) and vertically-polarized beams (e.g., 1V, 2V, 3V, etc.). By dynamically selecting individual beams for each beam set (e.g., each beam pair), techniques described herein may reduce a performance imbalance between beams of different polarizations (e.g., horizontally-polarized beams, vertically-polarized beams) within each beam set, which may improve a throughput and reliability of rank-2 and higher-rank communications (e.g., rank-4 communications).

For example, a base station 105 of the wireless communications system 100 may perform beam management procedure (e.g., P1-P2-P3 procedure, specifically during P1) during which the base station 105 transmits reference signals using different transmit beams within different time intervals (e.g., slots). During each of the time intervals, a UE 115 may cycle through different beams (e.g., different beams of beam pairs), and may perform measurements on the reference signals received using each beam. As such, the UE 115 may cycle through different combinations of vertically-polarized and horizontally-polarized beams to determine a beam set (e.g., beam set including a vertically-polarized beam and a horizontally-polarized beam) which exhibits the best performance for each respective transmit beam of the base station 105. For instance, the UE 115 may determine a first beam pair (e.g., 1H4V) exhibits the highest performance/quality for receiving communications from a first transmit beam (e.g., Tx1) of the base station 105 (e.g., because 1H and 4V are closely balanced), and may determine a second beam pair (e.g., 3H2V) exhibits the highest performance/quality for receiving communications from a second transmit beam (e.g., Tx2) of the base station 105. Subsequently, the UE 115 may select a beam set (beam pair), and may communicate with the base station 105 using the selected beam set.

In some aspects, the UE 115 may re-select beam sets based on determining a quality of communications performed using the selected beam set falls below some threshold quality. In such cases, the UE 115 may re-select a beam set based on the previously-performed measurements performed during the previous P1 procedure, based on performing a new P1 procedure with the base station 105, or both.

Techniques described herein may enable UEs 115 to dynamically select beam sets (e.g., beam pairs) including two or more beams with different polarizations. Enabling UEs 115 to dynamically select individual beams for each beam set (e.g., each beam pair) may reduce a performance imbalance between beams of different polarizations (e.g., horizontally-polarized beams, vertically-polarized beams) within each beam set, which may improve a throughput and reliability of rank-2 and higher-rank communications (e.g., rank-4 communications). Moreover, by reducing performance imbalance and improving a throughput of beam sets at the UE 115, techniques described herein may reduce a quantity of retransmissions performed by the UE 115, as well as reduce a transmission power of transmissions performed by the UE 115, thereby reducing power consumption and improving battery performance at the UE 115.

Figure 2:
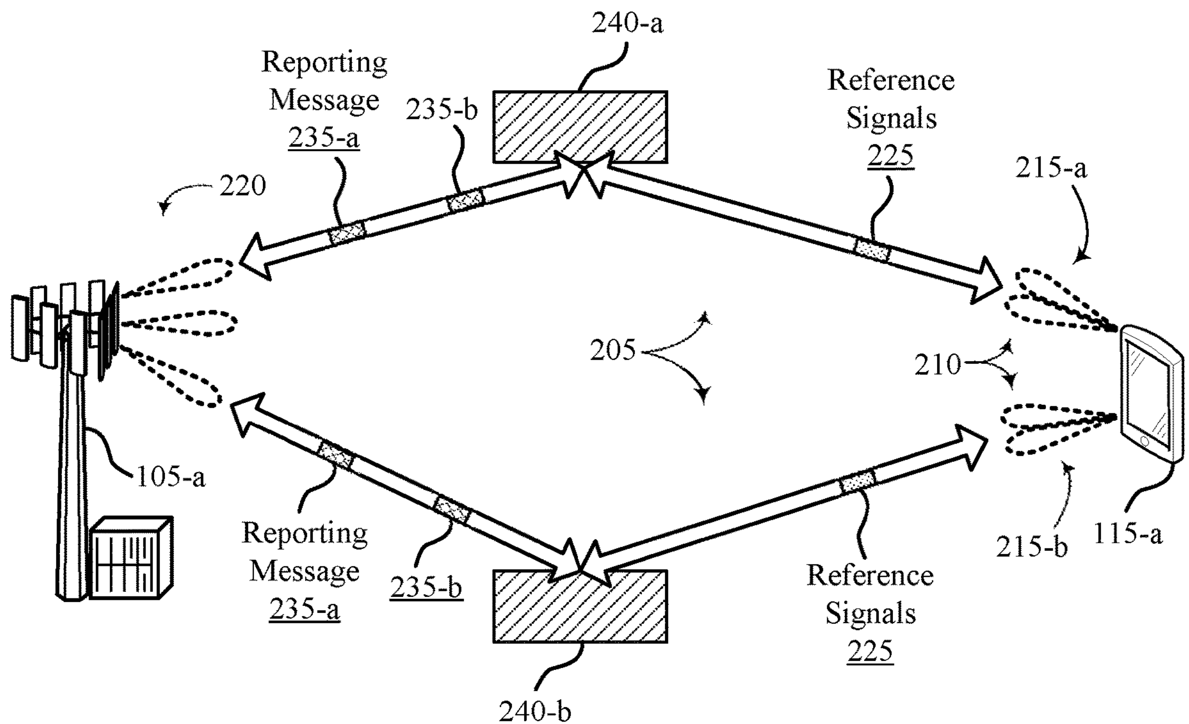
FIG. 2 illustrates an example of a wireless communications system that supports techniques for dynamically pairing beams in accordance with aspects of the present disclosure.
Figure 2:
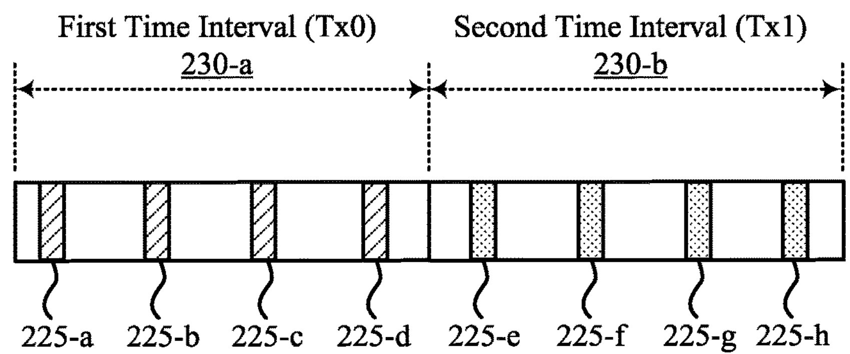

FIG. 2 illustrates an example of a wireless communications system 200 that supports techniques for dynamically pairing beams in accordance with aspects of the present disclosure. In some examples, wireless communications system 200 may implement aspects of wireless communications system 100. The UE 115-*a* of the wireless communications system 200 may support techniques for dynamically selecting beam sets (e.g., beam pairs) for wireless communications at the UE 115-*a*.

The wireless communications system 200 may include a base station 105-*a* and a UE 115-*a*, which may be examples of UEs 115, base stations 105, and other wireless devices as described with reference to FIG. 1. In some aspects, the UE 115-*a* may communicate with the base station 105-*a* using a communication link 205, which may be an example of an NR or LTE link between the base station 105-*a* and the UE 115-*a*. In some aspects, communication link 205 may include an example of an access link (e.g., Uu link) which may include bi-directional links that enable both uplink and downlink communication. For example, the UE 115-*a* may transmit uplink signals, such as uplink control signals or uplink data signals, to the base station 105-*a* using the communication link 205, and the base station 105-*a* may transmit downlink signals, such as downlink control signals or downlink data signals, to the UE 115-*a* using the communication link 205.

In some aspects, the UE 115-*a* and the base station 105-*a* may communicate with one another using one or more beams, one or more carriers, one or more communications links, or any combination thereof. In some aspects, the UE 115-*a* may communicate with the base station 105-*a* via one or more beam sets 210 (e.g., beam pairs). For the purposes of the present disclosure, the term "beam set 210" and "beam pair" may be used interchangeably to refer to a set of two or more beams (e.g., two or more beams that are at different polarizations with respect to the other beams of the set). The UE 115-*a* may be configured with multiple beam sets 210 (e.g., codebook of beam sets 210).

In some aspects, each beam set 210 of the multiple beam sets 210 configured at the UE 115-*a* may include at least one beam from a first set of beams 215-*a* associated with a first polarization, and at least one beam from a second set of beams 215-*b* associated with a second polarization different from the first polarization. Polarizations may include any polarizations known in the art including, but not limited to, horizontal polarization, vertical polarization, +45° polarization, ±30° polarization, and the like. For example, in some cases, the first set of beams 215-*a* may include vertically-polarized beams (e.g., 1V, 2V, 3V, 4V, etc.), and the second set of beams 215-*b* may include horizontally-polarized beams (e.g., 1H, 2H, 3H, 4H, etc.). In some aspects, the UE 115-*a* and the base station 105-*a* of the wireless communications system 200 may be configured to communicate within Frequency Range 2 (FR2) (e.g., mmW) which utilizes dual-polarization to achieve rank-2 communications which exploit multiplexing to enhance throughout, as will be discussed in further detail herein.

In cases where the UE 115-*a* is configured to communicate using beam sets 210 including two beams (e.g., rank-2 communications), each beam set 210 (e.g., beam pair) may include one beam from the first set of beams 215-*a* and one beam from the second set of beams 215-*b*. In other cases where the UE 115-*a* is configured to communicate using beam sets 210 including four beams (e.g., rank-4 communications), each beam set 210 may include two beams from the first set of beams 215-*a* and two beam from the second set of beams 215-*b*. In this regard, various beam sets may be generated/selected using various combinations of beams from the first set of beams 215-*a* and the second set of beams 215-*b*.

In some aspects, each beam of each beam pair (e.g., each beam of the first and second sets of beams 215) may be generated using a set of antenna elements (e.g., set of antenna feeds, antenna port) of the UE 115. For example, the beams from the first set of beams 215-*a* may be generated using a first antenna port including a first set of antenna elements, and beams of the second set of beams 215-*b* may be generated using a second antenna port including a second set of antenna elements which is different from the first set of antenna elements.

The base station 105-*a* may also be configured to communicate with the UE 115-*a* using one or more beams. For example, the base station 105-*a* may be configured to communicate with one or more beams 220. The beams 220 illustrated in FIG. 2 may be used to transmit downlink transmissions (e.g., transmit (Tx) beams 220), receive uplink transmissions (e.g., receive (Rx) beams 220), or both. In some aspects, the base station 105-*a* may be configured to communicate using beam sets (e.g., beam pairs) including beams of different polarizations, as described previously herein in the context of the UE 115-*a*.

In some aspects, the base station 105-*a*, the UE 115-*a*, or both, may perform directional beamforming for performing transmissions via the communication link 205. The UE 115-*a* may be configured to perform beam switching procedures to transition from one beam set 210 to another. For example, the UE 115-*a* may be configured to communicate using a first beam set 210, and may perform a beam switching procedure to transition from the first beam set 210 to a second beam set 210 in order to communicate according to the second beam set 210. Beam switching procedures may involve processing at the UE 115-*a*, retuning of radio frequency components, or both. In some cases, different beams within each beam set 210 may be configured according to different parameters (e.g., different transmission-configuration indicator (TCI) states, transmission powers).

As noted herein, some UEs 115 may statically select beam sets 210 (e.g., beam pairs) which will be used for communications with a base station 105. For example, a UE 115 may determine that a first beam pair (e.g., 1H, 1V beam set 210) will be used to receive downlink messages transmitted by the base station 105-*a* using a first transmit beam 220 (e.g., Tx1), and may determine that a second beam set 210 (e.g., 2H, 2V beam set 210) will be used to receive downlink messages transmitted by the base station 105-*a* using a second transmit beam 220 (e.g., Tx2). In such cases, collapsed metrics (e.g., collapsed values) between the respective antenna ports may be used to trigger a switch of beam sets 210 at the UE 115, and report requests to switch beam sets 210. However, statically selecting beam sets 210 may result in a degradation of wireless communications as the UE 115-*a* moves relative to the base station 105-*a*. In particular, statically selecting beams for beam sets 210 may cause the UE 115-*a* to be unable to efficiently track changes in beam direction and/or quality on the respective antenna ports (e.g., vertically-polarized antenna port, horizontally-polarized antenna port), which may reduce a capability of the UE 115-*a* to maintain efficient and reliable communications.

Moreover, beam sets 210 (e.g., beam pairs) may perform communications (e.g., rank-2 communications) over multiple beams (e.g., beams from different sets of beams 215) in order to exploit multiplexing. As such, a channel for each respective beam (e.g., horizontal beam and vertical beam) of each beam pair may be different. For example, as shown in FIG. 2, communications transmitted/received by beams of the first set of beams 215-*a* may propagate along a first path of the communication link 205 which is reflected/refracted off an object 240-*a* (e.g., non-line-of-sight (NLoS)). Conversely, communications transmitted/received by beams of the second set of beams 215-*b* may propagate along a second path of the communication link 205 which is reflected/refracted off an object 240-*b*. Objects 240 may include buildings, vehicles, and the like.

As such, continuing with the same example above, the channel for communications over the first set of beams 215-*a* may be different from (e.g., independent from) the channel for communications over the second set of beams 215-*b*. In cases where the respective sets of beams 215 are associated with different polarizations and/or antenna ports (e.g., vertically-polarized antenna port, horizontally-polarized antenna port), the channel for the respective polarizations may be different which may result in differing signals strengths and calibration errors between the respective polarizations/antenna ports. Moreover, cover may react differently for each respective antenna port.

Taken together, differing channel conditions for the respective sets of beams 215 (e.g., differing channel conditions for the beams of each beam set 210) may lead to an imbalance of performance between beams of each beam set 210, thereby reducing a throughput and reliability of rank-2 communications. In particular, performance imbalances between the beams of each beam set 210 (e.g., performance imbalance between antenna ports) may result in sub-optimal collapsed metrics between the antenna ports, which may degrade throughput for rank-2 communications. Differing channel conditions between beams of beam sets 210 including higher quantities of beams may similarly affect a throughput and reliability of higher-rank communications (e.g., rank-4 communications). For example, in the case of a performance imbalance across antenna ports, performing communications based on the antenna port with the larger signal strength (e.g., maximum function) may ignore or otherwise minimize an impact of communications over the antenna port with the smaller signal strength, which may result in a misshaped rank-2 channel array. Conversely, performing communications based on an average signal strength across the antenna ports with the performance imbalance (e.g., mean function) may decrease a potential performance gain associated with the antenna port with the higher signal strength, which also decreases a throughput of rank-2 communications.

Accordingly, the UE 115-*a* of the wireless communications system 200 may support techniques for dynamically selecting beam sets 210 (e.g., beam pairs) for wireless communications at the UE 115-*a*. In particular, the UE 115-*a* may support techniques for dynamically selecting beam sets 210 including horizontally-polarized beams (e.g., 1H, 2H, 3H, etc.) and vertically-polarized beams (e.g., 1V, 2V, 3V, etc.) to reduce performance imbalances between beams of respective beam sets 210, thereby improving throughput and reliability of wireless communications.

For example, the UE 115-*a* may communicate with the base station 105-*a* using a first beam set 210 (e.g., first beam pair) of a group of beam sets 210 configured at the UE 115-*a*. In some aspects, each beam set 210 of the group of beam sets 210 may include a beam from the first set of beams 215-*a* associated with a first polarization and a beam from a second set of beams 215-*b* associated with a second polarization different than the first polarization. For example, the first beam set 210 used for the communications at 305 may include a first beam associated with a horizontal polarization, and a second beam associated with a vertical polarization. In some aspects, the beams of the respective beam sets 210 may be generated using a different antenna ports (e.g., different sets of antennas). The communications performed using the first beam set 210 may include uplink communications, downlink communications, or both.

Each beam set 210 (e.g., each beam pair) may include two or more beams associated with two or more polarizations. For example, in the context of rank-2 communications, each beam set 210 (e.g., each beam pair) may include a first beam associated with a first polarization, and a second beam associated with a second polarization. By way of another example, in the context of rank-4 communications, each beam set 210 may include four beams including at least one beam associated with a first polarization, and at least one beam associated with a second polarization. Polarizations may include any polarizations known in the art including, but not limited to, horizontal polarization, vertical polarization, ±45° polarization, ±30° polarization, ±15° polarization, and the like.

In some aspects, the UE 115-*a* may receive a set of reference signals 225 from the base station 105-*a*. The UE 115-*a* may receive the set of reference signals 225 based on communicating with the base station 105-*a* using the first beam set 210. The reference signals 225 may include, but are not limited to, CSI-RSs, synchronization signals, and the like. As shown in FIG. 1, the UE 115-*a* may receive the reference signals 225 from the base station 105-*a* via the communication link 205, where the reference signals 225 are received by the respective antenna ports of the UE 115-*a* via their respective channels.

In some aspects, the UE 115-*a* may receive the set of reference signals 225 as part of a beam management procedure and/or a beam selection procedure (e.g., P1 procedure, P2 procedure, P3 procedure) with the base station 105-*a*. For example, the UE 115-*a* may receive the set of reference signals 225 within a set of time intervals 230 (e.g., slots, TTIs) which correspond to a set of transmit beams 220 of the base station 105-*a*. In this example, the UE 115-*a* may receive at least one reference signal 225 of the set of reference signals 225 in a time interval 230 of the set of time intervals 230.

For instance, the UE 115-*a* may be configured with the first set of beams 215-*a* including two horizontal beams (e.g., 1H, 2H) and the second set of beams 215-*b* including two vertical beams (e.g., 1V, 2V). As such, the UE 115-*a* may be configured to communicate using four different beam pairs (e.g., 1H1V, 1H2V, 2H1V, 2H2V). In this example, the base station 105-*a* may be configured with two transmit beams 220 (e.g., Tx0, Tx1). In this example, during a P1 procedure, the base station 105-*a* may transmit reference signals 225 using the first transmit beam 220 (Tx0) during a first time interval 230-*a* (e.g., first slot), and may transmit reference signals 225 using the second transmit beam 220 (Tx1) during a second time interval 230 (e.g., second slot). For instance, as illustrated in FIG. 1, the base station 105-*a* may be configured to transmit reference signals 225-*a*, 225-*b*, 225-*c*, and 225-d using the first transmit beam 220 (Tx0) during the first time interval 230-*a*. Similarly, the base station 105-*a* may be configured to transmit reference signals 225-*e*, 225-*f*, 225-*g*, and 225-*h* using the second transmit beam 220 (Tx1) during the second time interval 230-*b*.

During each of the time intervals 230, the UE 115-*a* may receive the reference signals 225 using at least a subset of the beam pairs of the UE 115-*a*. For instance, during the first time interval 230-*a*, the UE 115-*a* may cycle through each of the four different beam pairs (e.g., 1H1V, 1H2V, 2H1V, 2H2V) such that the UE 115-*a* receives the reference signals 225 associated with the first transmit beam 220 at the base station 105-*a* using each of the four different beam pairs. For example, the UE 115-*a* may receive the reference signal 225-*a* using the first beam pair 1H1V, and may receive the reference signal 225-*b* using the second beam pair 1H2V. Similarly, the UE 115-*b* may receive the reference signal 225-*c* and the reference signal 225-*d* using the third beam pair 2H1V and the fourth beam pair 2H2V, respectively.

Similarly, during the second time interval 230-*b*, the UE 115-*a* may cycle through each of the four different beam pairs (e.g., 1H1V, 1H2V, 2H1V, 2H2V) such that the UE 115-*a* receives the reference signals 225 associated with the second transmit beam 220 at the base station 105-*a* using each of the four different beam pairs. For example, the UE 115-*a* may receive the reference signal 225-*e* using the first beam pair 1H1V, and may receive the reference signal 225-*f* using the second beam pair 1H2V. Similarly, the UE 115-*b* may receive the reference signal 225-*g* and the reference signal 225-*h* using the third beam pair 2H1V and the fourth beam pair 2H2V, respectively.

It is noted here that the base station 105-*b* may be configured with any quantity of transmit beams 220, and may therefore be configured to transmit reference signals 225 using the respective transmit beams 220 during any quantity of time intervals 230. Moreover, the UE 115-*b* may be configured with any quantity of beam sets 210 (e.g., any quantity of beam pairs), and may therefore be configured to cycle through at least a subset of the configured beam sets 210 within each of the time intervals 230 corresponding to the respective transmit beams 220. As such, the example provided above in which the UE 115-*b* is configured with four beam pairs and the base station 105-*b* is configured with two transmit beams 220 is provided solely for illustrative purposes.

The UE 115-*a* may perform measurements for the set of reference signals 225. In this regard, the UE 115-*a* may perform measurements as part of a beam management procedure and/or beam selection procedure (e.g., P1 procedure, P2 procedure, P3 procedure) with the base station 105-*a*. The measurements may include, but are not limited to, reference signal received power (RSRP) measurements, reference signal received quality (RSRQ) measurements, received signal strength indicator (RSSI) measurements, SNR measurements, SINR measurements, channel quality indicator (CQI) measurements, or any combination thereof.

For example, continuing with the example above, the base station 105-*a* may be configured with two transmit beams 220, and the UE 115-*a* may be configured with four different beam sets 210 (e.g., four different beam pairs). In this example, the base station 105-*a* may transmit reference signals 225 using the first transmit beam 220 (Tx0) during the first time interval 230-*a* (e.g., first slot), and may transmit reference signals 225 using the second transmit beam 220 (Tx1) during a second time interval 230-*b* (e.g., second slot). During each of the time intervals 230, the UE 115-*a* may receive the reference signals 225 using at least a subset of the beam pairs of the UE 115-*a*, and may perform measurements associated with each of the beam pairs.

For instance, during the first time interval 230-*a*, the UE 115-*a* may cycle through each of the four different beam pairs (e.g., 1H1V, 1H2V, 2H1V, 2H2V) such that the UE 115-*a* receives the reference signals 225 associated with the first transmit beam 220 (Tx0) using each of the four different beam pairs. In this example, the UE 115-*a* may perform measurements on the reference signals 225 received using each of the beam pairs used to receive the reference signals 225 (e.g., measurements for 1V1H, measurements for 1V2H, etc.). Moreover, for each beam set (e.g., each beam pair), the UE 115-*a* may perform measurements on each antenna port associated with the respective beams of the beam set. For instance, when performing measurements for the beam pair 1H1V, the UE 115-*a* may perform measurements on the horizontally-polarized antenna port (e.g., antenna port for 1H), and may perform measurements on the vertically-polarized antenna port (e.g., antenna port for 1H). In this regard, for each beam set (beam pair) used to receive reference signals 225, the UE 115-*a* may perform separate sets of measurements associated with each respective beam and/or antenna port.

Continuing with the same example, during the second time interval 230-*b*, the UE 115-*a* may cycle through each of the four different beam pairs such that the UE 115-*a* receives the reference signals 225 associated with the second transmit beam 220 (Tx1) using each of the four different beam pairs (e.g., 1H1V, 1H2V, 2H1V, 2H2V), and may perform measurements on the reference signals 225 received using each of the beam pairs. Once again, for each beam pair used to receive reference signals 225, the UE 115-*a* may perform separate sets of measurements associated with each respective beam and/or antenna port.

In some aspects, the UE 115-*a* may be configured to determine which beam set 210 will exhibit the highest performance when communicating with respective beams (e.g., transmit beams 220) at the base station 105-*a*. The UE 115-*a* may be configured to dynamically pair beam sets 210 (e.g., beam pairs) used for communications at the UE 115-*a* with corresponding beams (e.g., transmit beams 220) used for communications at the base station 105-*a*. In other words, the UE 115-*a* may generate a codebook with pairings of beam sets 210 which are to be associated with respective beams at the base station 105-*a*. For example, in cases where the base station 105-*a* is configured with four transmit beams 220 (e.g., Tx0, Tx1, Tx2, Tx3), the UE 115-*a* may determine beam sets 210 (e.g., beam pairs) which exhibit the highest performance or quality for each of the respective transmit beams 220, as shown in Table 1 below:

TABLE 1

| Transmit beam 220 and Beam set 210 Pairings | | | | |
|---|---|---|---|---|
| Transmit beam 220 (Tx) | Tx0 | Tx1 | Tx2 | Tx3 |
| Beam set 210 (Rx: nHmV) | 1H4V | 3H2V | 4H1V | 2H3V |

In this example, the UE 115-*a* may determine that the beam pair 1H4V exhibits the highest quality for communications transmitted by the base station using the first transmit beam 220 Tx0. Similarly, the UE 115-*a* may determine that the beam pairs 3H2V, 4H1V, and 2H3V exhibit the highest quality for communications transmitted by the base station using the second transmit beam 220 Tx1, the third transmit beam 220 Tx2, and the fourth transmit beam 220 Tx3, respectively. In some aspects, the UE 115-*a* may dynamically pair the beam sets 210 (e.g., beam pairs) used for communications at the UE 115-*a* with corresponding beams (e.g., transmit beams 220) used for communications at the base station 105-*a* based on receiving the reference signals 225 from the base station 105-*b* and performing the measurements on the reference signals using the respective beam sets 210.

In some aspects, the UE 115-*a* may select a second beam set 210 (e.g., second beam pair) from the group of beam sets 210 configured at the UE 115-*a*. The UE 115-*a* may select the second beam set 210 based on communicating with the base station 105-*a* using the first beam set 210, receiving the reference signals 225, performing the measurements on the reference signals 225 using the respective beam sets 210, or any combination thereof.

In some implementations, the UE 115-*a* may select the second beam set 210 based on one or more parameters associated with the respective beam sets 210 of the group of beam sets 210 configured at the UE 115-*a*. Moreover, the UE 115-*a* may select the second beam set 210 based on one or more parameters associated with the second beam set 210. In particular, the UE 115-*a* may select the second beam set 210 by selecting individual beams (e.g., vertically-polarized and horizontally-polarized beams) based on the parameters associated with the respective beams. The parameters associated with the second beam sets 210 may be determined based on the measurements performed on the reference signals 225, and may include RSRPs, RSRQs, SNRs, and the like.

For instance, in selecting the second beam set 210, the UE 115-*a* may select a first beam from the first set of beams 215-*a* associated with the first polarization (e.g., horizontal polarization), and may select the second beam from the second set of beams 215-*b* associated with the second polarization (e.g., vertical polarization), where the second beam set 210 includes the first beam and the second beam. In this example, the UE 115-*a* may select the first and second beams based on parameters (e.g., RSRP, RSRQ, SNR) associated with each of the respective beams. The UE 115-*a* may select the first beam and the second beam, respectively, based on parameters associated with the first beam and second beam satisfying one or more thresholds, based on the first beam and/or the second beam having the highest quality from the sets of beams with similar polarizations, or both.

For instance, the UE 115-*a* may select the first beam (e.g., horizontally-polarized beam) of the second beam set 210 based on an RSRP value of the first beam $RSRP_1$ satisfying an RSRP threshold $RSRP_{Thresh}$ (e.g., based on $RSRP_1 \geq RSRP_{Thresh}$). In other cases, UE 115-*a* may select the first beam (e.g., horizontally-polarized beam) of the second beam set 210 based on the first beam having the highest RSRP value of the set of vertically-polarized beams configured at the UE 115-*a*. For example, in cases where the UE 115-*a* is configured with a set of four vertically-polarized beams (e.g., 1H, 2H, 3H, 4H), the UE 115-*a* may select the first beam (e.g., 1H) based on the RSRP value of the first beam $RSRP_1$ being greater than the RSRP values of the other horizontally-polarized beams (e.g., based on $RSRP_1 \geq RSRP_2$, $RSRP_3$, and $RSRP_4$).

Similarly, the UE 115-*a* may select the second beam (e.g., vertically-polarized beam) of the second beam set 210 based on parameters associated with the second beam satisfying one or more thresholds, based on the second beam having a higher quality than the other vertically-polarized beams configured at the UE 115-*a*, or both. In cases where the UE 115-*a* selects the first and second beams (e.g., vertically and horizontally-polarized beams) based on comparing the parameters associated with the respective beams to thresholds, the thresholds used to select the first and second beams may be the same or different.

In some aspects, the UE 115-*a* may select the second beam set 210 (e.g., second beam pair) based on determining a beam (e.g., transmit beam 220) which will be used by the base station 105-*a*. In particular, the UE 115-*a* may select the second beam set 210 (e.g., second beam pair) based on determining which beam set 210 (e.g., which beam pair) at the UE 115-*a* will exhibit the highest quality in association with the beam used for communications at the base station 105-*a*. For example, in cases where the base station 105-*a* performs communications using the second transmit beam 220 (Tx1) from Table 1 above, the UE 115-*a* may select the second beam pair 3H2V based on the determined dynamic pairings (e.g., codebook) of transmit beams 220 and beam sets 210 illustrated in Table 1. Conversely, by way of another example, if the UE 115-*a* determines that the base station 105-*a* is to perform communications using the fourth transmit beam 220 Tx4, the UE 115-*a* may select the beam pair 2H3V.

In some aspects, the UE 115-*a* may determine which beam (e.g., transmit beam 220) will be used by the base station 105-*a*, and therefore determine which beam set 210 should be selected, based on pre-configured resources for communications between the UE 115-*a* and the base station 105-*a*, based on control signaling scheduling communications between the UE 115-*a* and the base station 105-*a*, or both.

In some implementations, the UE 115-*a* may transmit a reporting message 235-*a* to the base station 105-*a*, where the reporting message 235-*a* includes an indication of the second beam set 210 which was selected by the UE 115-*a*. In this regard, the UE 115-*a* may indicate which beam set 210 will be used for wireless communications at the UE 115-*a*. The reporting message 235-*a* may include any reporting message known in the art, and may be transmitted as part of the beam management procedure and/or beam selection procedure between the UE 115-*a* and the base station 105-*a*. As shown in FIG. 1, the UE 115-*a* may transmit the reporting message 235-*a* to the base station 105-*a* via the communication link 205, where the reporting message 235-*a* is transmitted by the respective antenna ports via their respective channels.

The UE 115-*a* may communicate with the base station 105-*a* using the second beam set 210 (e.g., second beam pair). In some aspects, the UE 115-*a* may communicate using the second beam set 210 based on performing the communications using the first beam set 210, receiving the reference signals 225, performing the measurements on the reference signals 225 using the respective beam sets 210, selecting the second beam set 210, transmitting the reporting message 235-*a*, or any combination thereof. The communications performed using the second beam set 210 may include uplink communications, downlink communications, or both. For example, in some cases, the UE 115-*a* may transmit an uplink message to the base station 105-*a* using the second beam set 210. By way of another example, the UE 115-*a* may receive a downlink message from the base station 105-*a* using the second beam set 210.

In some implementations, the UE 115-*a* may determine one or more parameters associated with communications performed with the base station 105-*a* using the second beam set 210. Parameters associated with communications performed with the base station 105-*a* using the second beam set 210 may include RSRP measurements, RSRQ measurement, SNRs, SINRs, CQIs, and the like. In some cases, the UE 115-*a* may determine parameters associated with communications performed with the base station 105-*a* using the second beam set 210 by performing measurements on downlink messages received using the second beam set 210. Additionally, or alternatively, the UE 115-*a* may determine parameters associated with communications performed with the base station 105-*a* using the second beam set 210 based on information (e.g., CQI) or feedback received from the base station 105-*a*.

In some aspects, the UE 115-*a* may select a third beam set 210 (e.g., third beam pair) from the group of beam sets 210 configured at the UE 115-*a*. The UE 115-*a* may select the third beam set 210 based on communicating with the base station 105-*a* using the first beam set 210, receiving the reference signals 225, performing the measurements on the reference signals 225 using the respective beam sets 210, selecting the second beam set 210, transmitting the reporting message 235-*a*, performing the communications with the second beam set 210, determining the parameters associated with communications using the second beam set 210, or any combination thereof or any combination thereof.

In some implementations, the UE 115-*a* may select the third beam set 210 based on determining that a quality of communications with the base station 105-*a* using the second beam set 210 is less than or equal to some threshold quality. For example, the UE 115-*a* may monitor an RSRP associated with communications performed using the second beam set 210. Subsequently, the UE 115-*a* may determine that an RSRP associated with communications performed using the second beam set 210 is less than or equal to an RSRP threshold. Accordingly, in this example, the UE 115-*a* may select the third beam set 210 (e.g., third beam pair) based on determining that the RSRP associated with communications performed using the second beam set 210 is less than or equal to the RSRP threshold.

In additional or alternative implementations, the UE 115-*a* may select the third beam set 210 based on determining that the base station 105-*a* is to perform communications using a different beam (e.g., transmit beam 220). For example, referring to Table 1 above, the UE 115-*a* may have selected the second beam set 210 3H2V based on determining that the base station 105-*a* is configured to perform communications using the second transmit beam 220 Tx1. Subsequently, the UE 115-*a* may determine that the base station 105-*a* is to switch from the second transmit beam 220 Tx1 to the third transmit beam 220 Tx2. Accordingly, in this example, the UE 115-*a* may select the third beam set 210 4H1V based on determining that the base station 105-*a* is to perform communications using the third transmit beam 220 Tx2, as shown in Table 1.

In some aspects, the UE 115-*a* may be configured to select the third transmit beam 220 based on the received reference signals 225 and/or the measurements performed on the received reference signals. In this regard, the UE 115-*a* may be configured to select the third beam set 210 based on a previously-performed beam management procedure and/or beam selection procedure. For example, the UE 115-*a* may generate Table 1 including the dynamic pairings of transmit beams 220 and beam sets 210 based on a previously-performed P1-P2-P3 procedure, and may select the third beam set 210 using Table 1. Additionally, or alternatively, the UE 115-*a* may perform a new beam management procedure and/or beam selection procedure in order to select the third beam set 210. For example, in such cases, the UE 115-*a* may receive an additional set of references signals 225 from the base station 105-*b*, cycle through beam sets 210 to perform measurements using the respective beam sets 210, and generate new dynamic pairings between transmit beams 220 and beam sets 210. In this regard, the UE 115-*a* may select the third beam set 210 based on dynamic pairings of beam sets 210 at the UE 115-*a* and beams at the base station 105-*a* which are determined based on a new beam management procedure and/or beam selection procedure (e.g., new P1-P2-P3 procedure).

The UE 115-*a* may transmit a reporting message 235-*b* to the base station 105-*a*, where the reporting message 235-*b* includes an indication of the third beam set 210. In this regard, the UE 115-*a* may indicate which beam set 210 will be used for wireless communications at the UE 115-*a*. The reporting message 235-*b* may include any reporting message known in the art, and may be transmitted as part of the beam management procedure and/or beam selection procedure between the UE 115-*a* and the base station 105-*a*. Subsequently, the UE 115-*a* may communicate with the base station 105-*a* using the third beam set 210 (e.g., third beam pair). In some aspects, the UE 115-*a* may communicate using the third beam set 210 based on selecting the third beam set 210, transmitting the reporting message 235-*b*, or both. The communications performed using the third beam set 210 may include uplink communications, downlink communications, or both. For example, in some cases, the UE 115-*a* may transmit an uplink message to the base station 105-*a* using the third beam set 210. By way of another example, the UE 115-*a* may receive a downlink message from the base station 105-*a* using the third beam set 210.

Techniques described herein may enable the UE 115-*a* to dynamically select beam sets 210 (e.g., beam pairs) including two or more beams with different polarizations. Enabling the UE 115-*a* to dynamically select individual beams for each beam set 210 (e.g., each beam pair) may reduce a performance imbalance between beams of different polarizations (e.g., horizontally-polarized beams, vertically-polarized beams) within each beam set 210, which may improve a throughput and reliability of rank-2 and higher-rank communications (e.g., rank-4 communications). Moreover, by reducing performance imbalance and improving a throughput of beam sets 210 at the UE 115-*a*, techniques described herein may reduce a quantity of retransmissions performed by the UE 115-*a*, as well as reduce a transmission power of transmissions performed by the UE 115-*a*, thereby reducing power consumption and improving battery performance at the UE 115-*a*.

Figure 3:
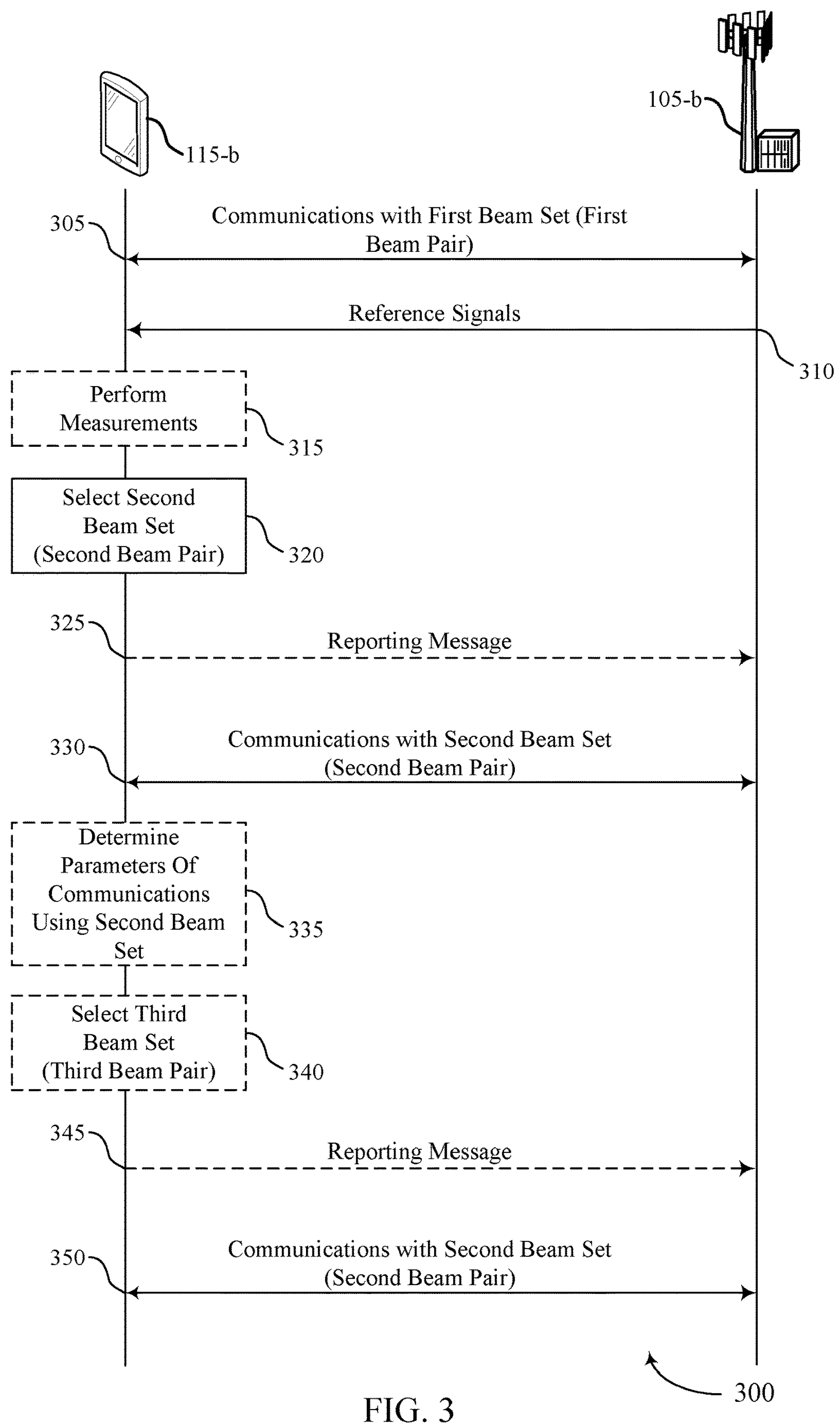
FIG. 3 illustrates an example of a process flow that supports techniques for dynamically pairing beams in accordance with aspects of the present disclosure.

FIG. 3 illustrates an example of a process flow 300 that supports techniques for dynamically pairing beams in accordance with aspects of the present disclosure. In some examples, process flow 400 may implement, or be implemented by, aspects of wireless communications system 100, wireless communications system 200, or both. For example, the process flow 300 may illustrate a UE 115-*b* which is configured to communicate using a first beam set, receive reference signals using additional beam sets, select a new beam set, and communicate using the selected beam set, as described with reference to FIGS. 1-2, among other aspects.

In some aspects, the process flow 300 may include a UE 115-*b* and a base station 105-*b*, which may include examples of UEs 115, base stations 105, and other wireless devices described with reference to FIGS. 1-2. For example, the UE 115-*b* and base station 105-*b* illustrated in FIG. 3 may be examples of the UE 115-*a* and base station 105-*a*, respectively, as illustrated in FIG. 2.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305, the UE 115-*b* may communicate with the base station 105-*b* using a first beam set (e.g., first beam pair) of a group of beam sets configured at the UE 115-*b*. In some aspects, each beam set of the group of beam sets may include a beam from a first set of beams associated with a first polarization and a beam from a second set of beams associated with a second polarization different than the first polarization. For example, the first beam set used for the communications at 305 may include a first beam associated with a first polarization, and a second beam associated with a second polarization. In some aspects, the beams of the respective beam sets may be generated using a different antenna ports (e.g., different sets of antennas). The communications performed using the first beam set may include uplink communications, downlink communications, or both.

Each beam set (e.g., each beam pair) may include two or more beams associated with two or more polarizations. For example, in the context of rank-2 communications, each beam set (e.g., each beam pair) may include a first beam associated with a first polarization, and a second beam associated with a second polarization. By way of another example, in the context of rank-4 communications, each beam set may include four beams including at least one beam associated with a first polarization, and at least one beam associated with a second polarization. Polarizations may include any polarizations known in the art including, but not limited to, horizontal polarization, vertical polarization, ±45° polarization, ±30° polarization, ±15° polarization, and the like.

At 310, the UE 115-*b* may receive a set of reference signals from the base station 105-*b*. The UE 115-*b* may receive the set of reference signals at 310 based on communicating with the base station 105-*b* using the first beam set at 305. The reference signals may include, but are not limited to, CSI-RSs, synchronization signals, and the like.

In some aspects, the UE 115-*b* may receive the set of reference signals as part of a beam management procedure and/or a beam selection procedure (e.g., P1 procedure, P2 procedure, P3 procedure) with the base station 105-*b*. For example, the UE 115-*b* may receive the set of reference signals within a set of time intervals (e.g., slots, TTIs) which correspond to a set of transmit beams of the base station 105-*b*. In this example, the UE 115-*b* may receive at least one reference signal of the set of reference signals in a time interval of the set of time intervals.

For instance, the UE 115-*b* may be configured with a set of four horizontal beams (e.g., 1H, 2H, 3H, 4H) and a set of four vertical beams (e.g., 1V, 2V, 3V, 4V). As such, the UE 115-*b* may be configured to communicate using sixteen different beam pairs (e.g., 1H1V, 1H2V, 1H3V, 1H4V, 2H1V, 2H2V, etc.). In this example, the base station 105-*b* may be configured with two transmit beams (e.g., Tx0, Tx1). In this example, during a P1 procedure, the base station 105-*b* may transmit reference signals using the first transmit beam during a first time interval (e.g., first slot), and may transmit reference signals using the second transmit beam during a second time interval (e.g., second slot). During each of the time intervals, the UE 115-*b* may receive the reference signals using at least a subset of the beam pairs of the UE 115-*b*. For instance, during the first time interval, the UE 115-*b* may cycle through each of the sixteen different beam pairs such that the UE 115-*b* receives the reference signals associated with the first transmit beam at the base station 105-*b* using each of the sixteen different beam pairs. Similarly, during the second time interval, the UE 115-*b* may cycle through each of the sixteen different beam pairs such that the UE 115-*b* receives the reference signals associated with the second transmit beam at the base station 105-*b* using each of the sixteen different beam pairs. In some implementations, the UE 115-*b* may cycle through only a subset of the sixteen beam pairs during each of the time intervals.

At 315, the UE 115-*b* may perform measurements for the set of reference signals received at 310. In this regard, the UE 115-*b* may perform measurements at 315 as part of a beam management procedure and/or beam selection procedure (e.g., P1 procedure, P2 procedure, P3 procedure) with the base station 105-*b*. The measurements may include, but are not limited to, RSRP measurements, RSRQ measurements, RSSI measurements, SNR measurements, SINR measurements, CQI measurements, or any combination thereof.

For example, continuing with the example above, the base station 105-*b* may be configured with two transmit beams, and the UE 115-*b* may be configured with sixteen different beam sets (e.g., sixteen different beam pairs). In this example, the base station 105-*a* may transmit reference signals using the first transmit beam during a first time interval (e.g., first slot), and may transmit reference signals using the second transmit beam during a second time interval (e.g., second slot). During each of the time intervals, the UE 115-*b* may receive the reference signals using at least a subset of the beam pairs of the UE 115-*b*, and may perform measurements associated with each of the beam pairs.

For instance, during the first time interval, the UE 115-*b* may cycle through each of the sixteen different beam pairs such that the UE 115-*b* receives the reference signals associated with the first transmit beam at the base station 105-*b* using each of the sixteen different beam pairs. In this example, the UE 115-*b* may perform measurements on the reference signals received using each of the beam pairs used to receive the reference signals (e.g., measurements for 1H1V, measurements for 1H2V, etc.). Moreover, for each beam pair, the UE 115-*b* may perform measurements on each antenna port associated with the respective beams of the beam pair. For instance, when performing measurements for the beam pair 1H1V, the UE 115-*b* may perform measurements on the horizontally-polarized antenna port (e.g., antenna port for 1H), and may perform measurements on the vertically-polarized antenna port (e.g., antenna port for 1H). In this regard, for each beam pair used to receive reference signals, the UE 115-*b* may perform separate sets of measurements associated with each respective beam and/or antenna port.

Continuing with the same example, during the second time interval, the UE 115-*b* may cycle through each of the sixteen different beam pairs such that the UE 115-*b* receives the reference signals associated with the second transmit beam at the base station 105-*b* using each of the sixteen different beam pairs, and may perform measurements on the reference signals received using each of the beam pairs. Once again, for each beam pair used to receive reference signals, the UE 115-*b* may perform separate sets of measurements associated with each respective beam and/or antenna port.

In some aspects, the UE 115-*b* may be configured to determine which beam set will exhibit the highest performance when communicating with respective beams at the base station 105-*b*. The UE 115-*b* may be configured to dynamically pair beam sets (e.g., beam pairs) used for communications at the UE 115-*b* with corresponding beams (e.g., transmit beams) used for communications at the base station 105-*b*. In other words, the UE 115-*b* may generate a codebook with pairings of beam sets which are to be associated with respective beams at the base station 105-*b*. For example, in cases where the base station 105-*b* is configured with four transmit beams (e.g., Tx0, Tx1, Tx2, Tx3), the UE 115-*b* may determine beam sets (e.g., beam pairs) which exhibit the highest performance or quality for each of the respective transmit beams, as shown in Table 1 above.

At 320, the UE 115-*b* may select a second beam set (e.g., second beam pair) from the group of beam sets configured at the UE 115-*b*. The UE 115-*b* may select the second beam set based on communicating with the base station 105-*b* using the first beam set at 305, receiving the reference signals at 310, performing the measurements at 315, or any combination thereof.

In some implementations, the UE 115-*b* may select the second beam set at 320 based on one or more parameters associated with the respective beam sets of the group of beam sets configured at the UE 115-*b*. Moreover, the UE 115-*b* may select the second beam set at 320 based on one or more parameters associated with the second beam set. In particular, the UE 115-*b* may select the second beam set by selecting individual beams (e.g., vertically-polarized and horizontally-polarized beams) based on the parameters associated with the respective beams. The parameters associated with the second beam sets may be determined based on the measurements performed at 315, and may include RSRPs, RSRQs, SNRs, and the like.

For instance, in selecting the second beam set, the UE 115-*b* may select a first beam from the first set of beams associated with the first polarization (e.g., horizontal polarization), and may select the second beam from the second set of beams associated with the second polarization (e.g., vertical polarization), where the second beam set includes the first beam and the second beam. In this example, the UE 115-*b* may select the first and second beams based on parameters (e.g., RSRP, RSRQ, SNR) associated with each of the respective beams. The UE 115-*b* may select the first beam and the second beam, respectively, based on parameters associated with the first beam and second beam satisfying one or more thresholds, based on the first beam and/or the second beam having the highest quality from the sets of beams with similar polarizations, or both.

For instance, the UE 115-*b* may select the first beam (e.g., horizontally-polarized beam) of the second beam set based on an RSRP value of the first beam $RSRP_1$ satisfying an RSRP threshold $RSRP_{Thresh}$ (e.g., based on $RSRP_1 \geq RSRP_{Thresh}$). In other cases, UE 115-*b* may select the first beam (e.g., horizontally-polarized beam) of the second beam set based on the first beam having the highest RSRP value of the set of vertically-polarized beams configured at the UE 115-*b*. For example, in cases where the UE 115-*b* is configured with a set of four horizontally-polarized beams (e.g., 1H, 2H, 3H, 4H), the UE 115-*b* may select the first beam (e.g., 1H) based on the RSRP value of the first beam $RSRP_1$ being greater than the RSRP values of the other horizontally-polarized beams (e.g., based on $RSRP_1 \geq RSRP_2$, $RSRP_3$, and $RSRP_4$).

Similarly, the UE 115-*b* may select the second beam (e.g., vertically-polarized beam) of the second beam set based on parameters associated with the second beam satisfying one or more thresholds, based on the second beam having a higher quality than the other vertically-polarized beams configured at the UE 115-*b*, or both. In cases where the UE 115-*b* selects the first and second beams (e.g., vertically and horizontally-polarized beams) based on comparing the parameters associated with the respective beams to thresholds, the thresholds used to select the first and second beams may be the same or different.

In some aspects, the UE 115-*b* may select the second beam set (e.g., second beam pair) at 320 based on determining a beam (e.g., transmit beam) which will be used by the base station 105-*b*. In particular, the UE 115-*b* may select the second beam set (e.g., second beam pair) at 320 based on determining which beam set (e.g., which beam pair) at the UE 115-*b* will exhibit the highest quality in association with the beam used for communications at the base station 105-*b*. For example, in cases where the base station 105-*b* performs communications using the second transmit beam (Tx1) from Table 1 above, the UE 115-*b* may select the second beam pair 3H2V based on the determined dynamic pairings (e.g., codebook) of transmit beams and beam sets illustrated in Table 1. Conversely, by way of another example, if the UE 115-*b* determines that the base station 105-*b* is to perform communications using the fourth transmit beam Tx4, the UE 115-*b* may select the beam pair 2H3V.

In some aspects, the UE 115-*b* may determine which beam (e.g., transmit beam) will be used by the base station 105-*b*, and therefore determine which beam set should be selected, based on pre-configured resources for communications between the UE 115-*b* and the base station 105-*b*, based on control signaling scheduling communications between the UE 115-*b* and the base station 105-*b*, or both.

At 325, the UE 115-*b* may transmit a reporting message to the base station 105-*b*, where the reporting message includes an indication of the second beam set which was selected at 320. In this regard, the UE 115-*b* may indicate which beam set will be used for wireless communications at the UE 115-*b*. The reporting message may include any reporting message known in the art, and may be transmitted as part of the beam management procedure and/or beam selection procedure between the UE 115-*b* and the base station 105-*b*.

At 330, the UE 115-*b* may communicate with the base station 105-*b* using the second beam set (e.g., second beam pair). In some aspects, the UE 115-*b* may communicate using the second beam set at 330 based on performing the communications using the first beam set at 305, receiving the reference signals at 310, performing the measurements at 315, selecting the second beam set at 320, transmitting the reporting message at 325, or any combination thereof. The communications performed using the second beam set may include uplink communications, downlink communications, or both. For example, in some cases, the UE 115-*b* may transmit an uplink message to the base station 105-*b* using the second beam set. By way of another example, the UE 115-*b* may receive a downlink message from the base station 105-*b* using the second beam set.

At 335, the UE 115-*b* may determine one or more parameters associated with communications performed with the base station 105-*b* using the second beam set. Parameters associated with communications performed with the base station 105-*b* using the second beam set may include RSRP measurements, RSRQ measurements, SNRs, SINRs, CQIs, and the like. In some cases, the UE 115-*b* may determine parameters associated with communications performed with the base station 105-*b* using the second beam set by performing measurements on downlink messages received using the second beam set. Additionally, or alternatively, the UE 115-*b* may determine parameters associated with communications performed with the base station 105-*b* using the second beam set based on information (e.g., CQI) or feedback received from the base station 105-*b*.

At 340, the UE 115-*b* may select a third beam set (e.g., third beam pair) from the group of beam sets configured at the UE 115-*b*. The UE 115-*b* may select the third beam set based on communicating with the base station 105-*b* using the first beam set at 305, receiving the reference signals at 310, performing the measurements at 315, selecting the second beam set at 320, transmitting the reporting message at 325, performing the communications with the second beam set at 330, determining the parameters associated with communications using the second beam set at 335, or any combination thereof or any combination thereof.

In some implementations, the UE 115-*b* may select the third beam set based on determining that a quality of communications with the base station 105-*b* using the second beam set is less than or equal to some threshold quality. For example, at 335, the UE 115-*b* may monitor an RSRP associated with communications performed using the second beam set. Subsequently, the UE 115-*b* may determine that an RSRP associated with communications performed using the second beam set is less than or equal to an RSRP threshold. Accordingly, in this example, the UE 115-*b* may select the third beam set (e.g., third beam pair) based on determining that the RSRP associated with communications performed using the second beam set is less than or equal to the RSRP threshold.

In additional or alternative implementations, the UE 115-*b* may select the third beam set based on determining that the base station 105-*b* is to perform communications using a different beam (e.g., transmit beam). For example, referring to Table 1 above, the UE 115-*b* may have selected the second beam set 3H2V at 320 based on determining that the base station 105-*b* is configured to perform communications using the second transmit beam Tx1. Subsequently, the UE 115-*b* may determine that the base station 105-*b* is to switch from the second transmit beam Tx1 to the third transmit beam Tx2. Accordingly, in this example, the UE 115-*b* may select the third beam set 4H1V based on determining that the base station 105-*b* is to perform communications using the third transmit beam Tx2, as shown in Table 1.

In some aspects, the UE 115-*b* may be configured to select the third transmit beam based on the reference signals received at 310 and/or the measurements performed at 315. In this regard, the UE 115-*b* may be configured to select the third beam set based on a previously-performed beam management procedure and/or beam selection procedure. For example, the UE 115-*b* may generate Table 1 including the dynamic pairings of transmit beams and beam sets based on a previously-performed P1-P2-P3 procedure, and may select the third beam set using Table 1. Additionally, or alternatively, the UE 115-*b* may perform a new beam management procedure and/or beam selection procedure in order to select the third beam set. For example, in such cases, the UE 115-*b* may receive an additional set of references signals from the base station 105-*b*, cycle through beam sets to perform measurements using the respective beam sets, and generate new dynamic pairings between transmit beams and beam sets. In this regard, the UE 115-*b* may select the third beam set based on dynamic pairings of beam sets at the UE 115-*b* and beams at the base station 105-*b* which are determined based on a new beam management procedure and/or beam selection procedure (e.g., new P1-P2-P3 procedure).

At 345, the UE 115-*b* may transmit a reporting message to the base station 105-*b*, where the reporting message includes an indication of the third beam set which was selected at 340. In this regard, the UE 115-*b* may indicate which beam set will be used for wireless communications at the UE 115-*b*. The reporting message may include any reporting message known in the art, and may be transmitted as part of the beam management procedure and/or beam selection procedure between the UE 115-*b* and the base station 105-*b*.

At 350, the UE 115-*b* may communicate with the base station 105-*b* using the third beam set (e.g., third beam pair). In some aspects, the UE 115-*b* may communicate using the third beam set at 350 based on selecting the third beam set at 340, transmitting the reporting message at 345, or both. The communications performed using the third beam set may include uplink communications, downlink communications, or both. For example, in some cases, the UE 115-*b* may transmit an uplink message to the base station 105-*b* using the third beam set. By way of another example, the UE 115-*b* may receive a downlink message from the base station 105-*b* using the third beam set.

Techniques described herein may enable the UE 115-*b* to dynamically select beam sets (e.g., beam pairs) including two or more beams with different polarizations. Enabling the UE 115-*b* to dynamically select individual beams for each beam set (e.g., each beam pair) may reduce a performance imbalance between beams of different polarizations (e.g., horizontally-polarized beams, vertically-polarized beams) within each beam set, which may improve a throughput and reliability of rank-2 and higher-rank communications (e.g., rank-4 communications). Moreover, by reducing performance imbalance and improving a throughput of beam sets at the UE 115-*b*, techniques described herein may reduce a quantity of retransmissions performed by the UE 115-*b*, as well as reduce a transmission power of transmissions performed by the UE 115-*b*, thereby reducing power consumption and improving battery performance at the UE 115-*b*.

Figure 4:
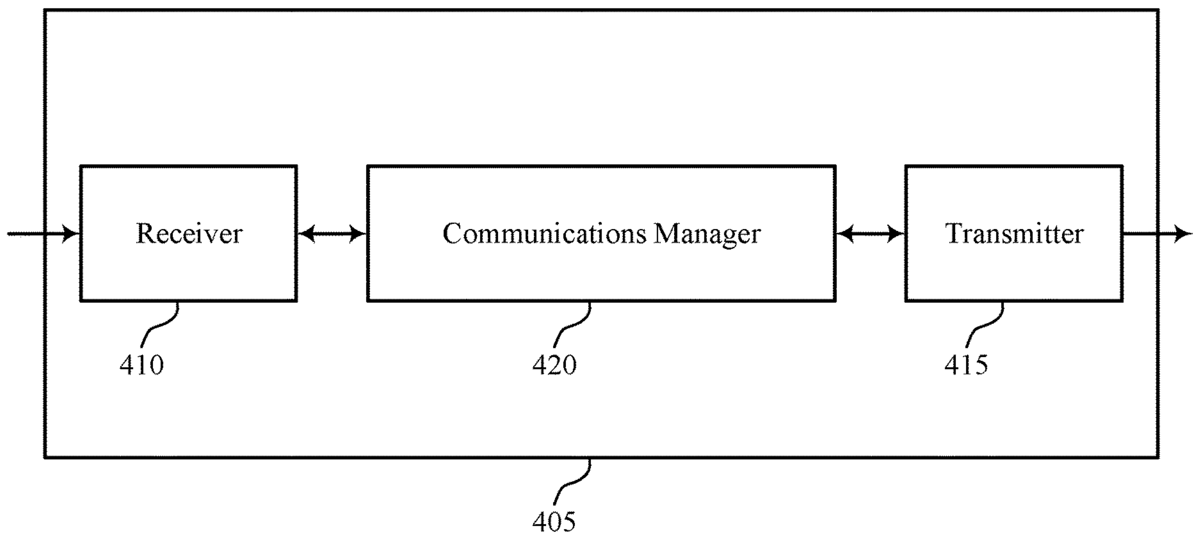
FIGS. 4 and 5 show block diagrams of devices that support techniques for dynamically pairing beams in accordance with aspects of the present disclosure.

FIG. 4 shows a block diagram 400 of a device 405 that supports techniques for dynamically pairing beams in accordance with aspects of the present disclosure. The device 405 may be an example of aspects of a UE 115 as described herein. The device 405 may include a receiver 410, a transmitter 415, and a communications manager 420. The device 405 may also include one or more processors, memory coupled with the one or more processors, and instructions stored in the memory that are executable by the one or more processors to enable the one or more processors to perform the dynamic beam pairing features discussed herein. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for dynamically pairing beams). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for dynamically pairing beams). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for dynamically pairing beams as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for communicating with a base station using a first beam set of a set of multiple beam sets of the UE, each beam set of the set of multiple beam sets including a beam from a first set of multiple beams associated with a first polarization and a beam from a second set of multiple beams associated with a second polarization different than the first polarization. The communications manager 420 may be configured as or otherwise support a means for receiving a set of multiple reference signals in a set of multiple time intervals corresponding to a set of multiple transmit beams of the base station, where, for each beam of the first set of multiple beams and the second set of multiple beams, the UE receives at least one reference signal of the set of multiple reference signals in a time interval of the set of multiple time intervals. The communications manager 420 may be configured as or otherwise support a means for selecting a second beam set from the set of multiple beam sets based on one or more parameters associated with the second beam set and based on receiving the set of multiple reference signals. The communications manager 420 may be configured as or otherwise support a means for communicating with the base station using the selected second beam set.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for dynamically selecting beam sets (e.g., beam pairs) including two or more beams with different polarizations. Enabling UEs 115 to dynamically select individual beams for each beam set (e.g., each beam pair) may reduce a performance imbalance between beams of different polarizations (e.g., horizontally-polarized beams, vertically-polarized beams) within each beam set, which may improve a throughput and reliability of rank-2 and higher-rank communications (e.g., rank-4 communications). Moreover, by reducing performance imbalance and improving a throughput of beam sets at a UE 115, techniques described herein may reduce a quantity of retransmissions performed by the UE 115, as well as reduce a transmission power of transmissions performed by the UE 115, thereby reducing power consumption and improving battery performance at the UE 115.

Figure 5:
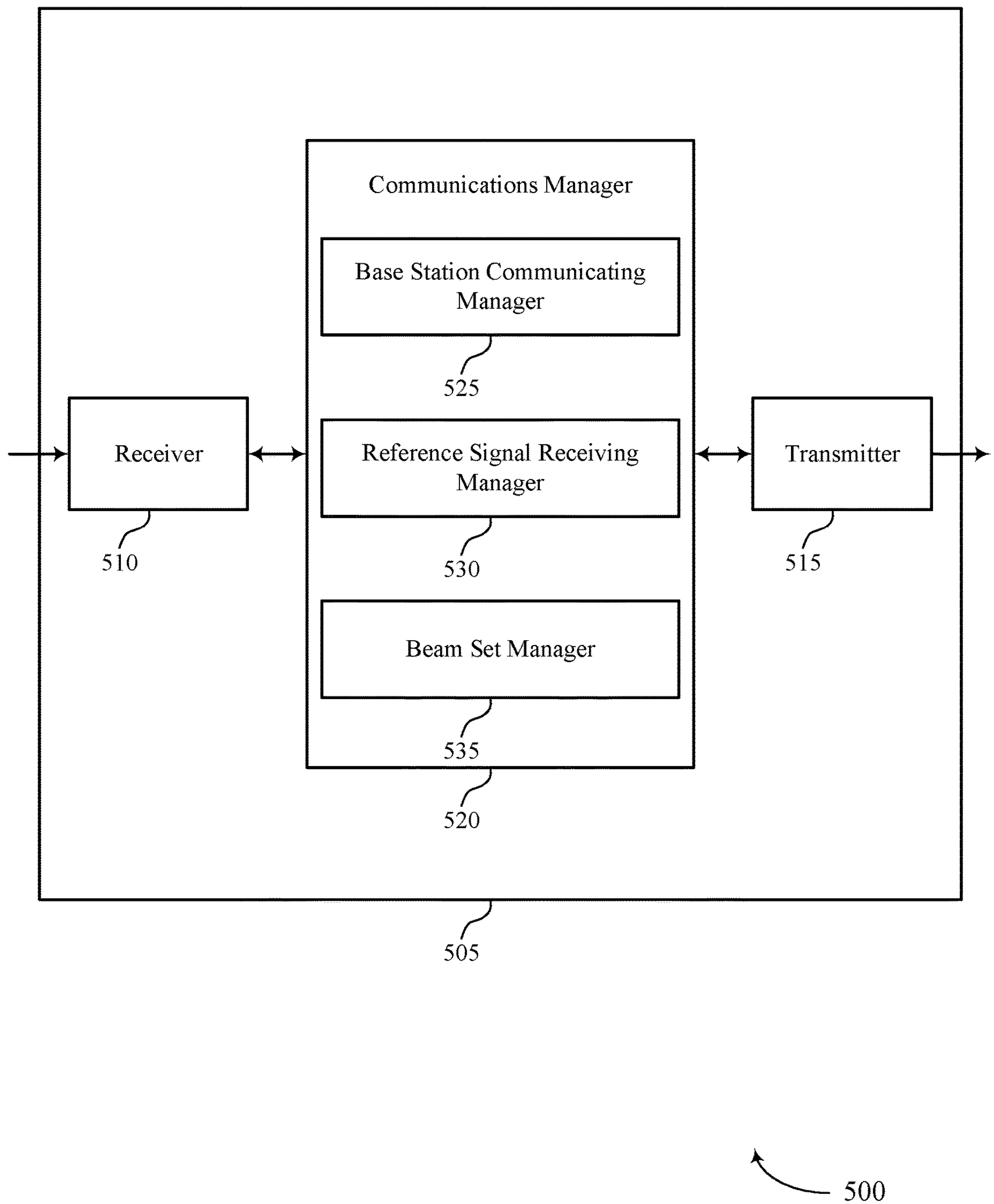

FIG. 5 shows a block diagram 500 of a device 505 that supports techniques for dynamically pairing beams in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for dynamically pairing beams). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for dynamically pairing beams). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for dynamically pairing beams as described herein. For example, the communications manager 520 may include a base station communicating manager 525, a reference signal receiving manager 530, a beam set manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The base station communicating manager 525 may be configured as or otherwise support a means for communicating with a base station using a first beam set of a set of multiple beam sets of the UE, each beam set of the set of multiple beam sets including a beam from a first set of multiple beams associated with a first polarization and a beam from a second set of multiple beams associated with a second polarization different than the first polarization. The reference signal receiving manager 530 may be configured as or otherwise support a means for receiving a set of multiple reference signals in a set of multiple time intervals corresponding to a set of multiple transmit beams of the base station, where, for each beam of the first set of multiple beams and the second set of multiple beams, the UE receives at least one reference signal of the set of multiple reference signals in a time interval of the set of multiple time intervals. The beam set manager 535 may be configured as or otherwise support a means for selecting a second beam set from the set of multiple beam sets based on one or more parameters associated with the second beam set and based on receiving the set of multiple reference signals. The base station communicating manager 525 may be configured as or otherwise support a means for communicating with the base station using the selected second beam set.

In some cases, the base station communicating manager 525, the reference signal receiving manager 530, the beam set manager 535, or any combination thereof, may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the base station communicating manager 525, the reference signal receiving manager 530, the beam set manager 535, or any combination thereof, as discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 6:
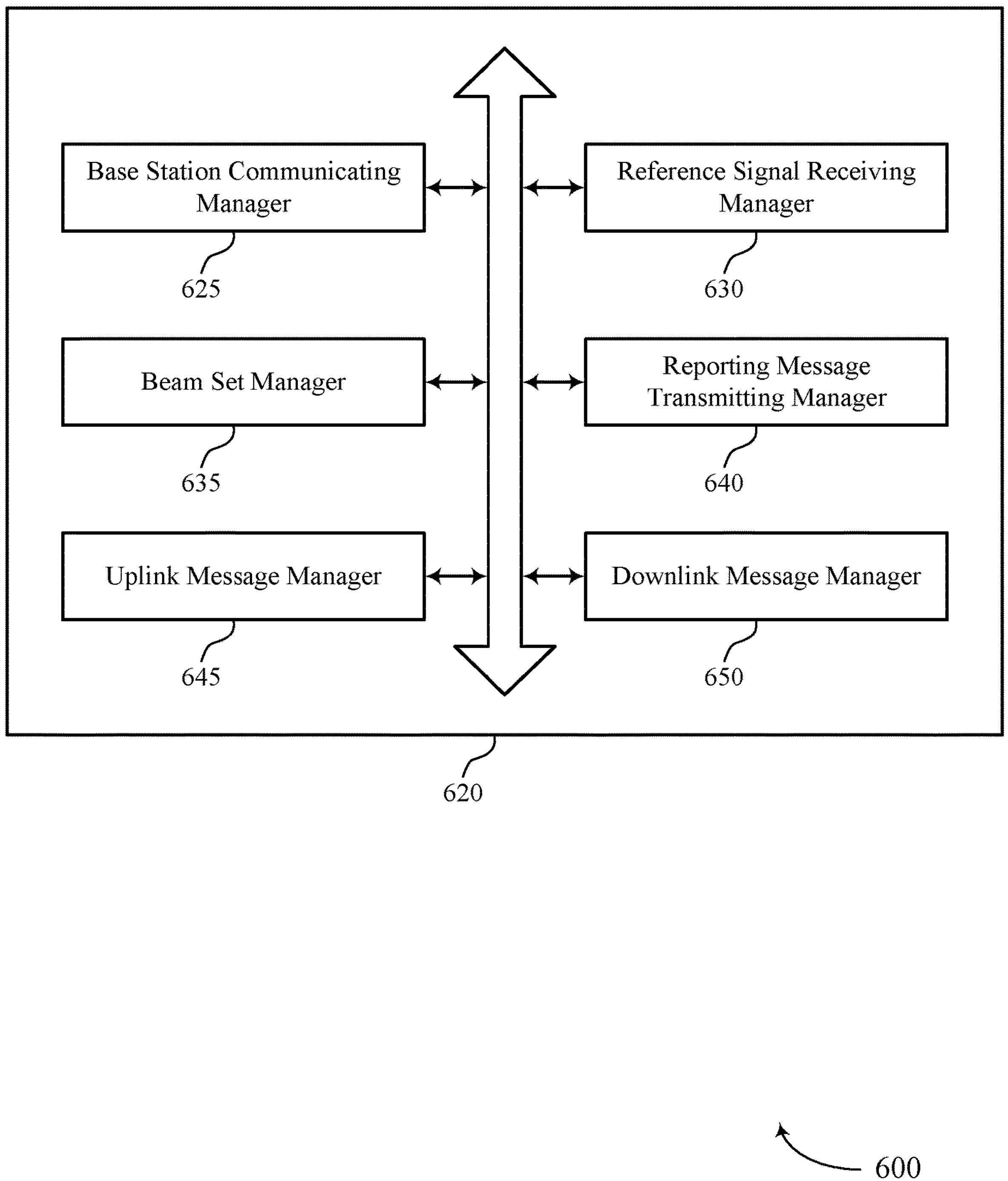
FIG. 6 shows a block diagram of a communications manager that supports techniques for dynamically pairing beams in accordance with aspects of the present disclosure.

FIG. 6 shows a block diagram 600 of a communications manager 620 that supports techniques for dynamically pairing beams in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for dynamically pairing beams as described herein. For example, the communications manager 620 may include a base station communicating manager 625, a reference signal receiving manager 630, a beam set manager 635, a reporting message transmitting manager 640, an uplink message manager 645, a downlink message manager 650, or any combination thereof. Each of these components may communicate, directly or indirectly, with one another (e.g., via one or more buses).

The communications manager 620 may support wireless communication at a UE in accordance with examples as disclosed herein. The base station communicating manager 625 may be configured as or otherwise support a means for communicating with a base station using a first beam set of a set of multiple beam sets of the UE, each beam set of the set of multiple beam sets including a beam from a first set of multiple beams associated with a first polarization and a beam from a second set of multiple beams associated with a second polarization different than the first polarization. The reference signal receiving manager 630 may be configured as or otherwise support a means for receiving a set of multiple reference signals in a set of multiple time intervals corresponding to a set of multiple transmit beams of the base station, where, for each beam of the first set of multiple beams and the second set of multiple beams, the UE receives at least one reference signal of the set of multiple reference signals in a time interval of the set of multiple time intervals. The beam set manager 635 may be configured as or otherwise support a means for selecting a second beam set from the set of multiple beam sets based on one or more parameters associated with the second beam set and based on receiving the set of multiple reference signals. In some examples, the base station communicating manager 625 may be configured as or otherwise support a means for communicating with the base station using the selected second beam set.

In some examples, the reporting message transmitting manager 640 may be configured as or otherwise support a means for transmitting, to the base station, a reporting message including an indication of the second beam set, where communicating with the base station using the second beam set is based on transmitting the reporting message.

In some examples, to support selecting the second beam set from the set of multiple beam sets, the beam set manager 635 may be configured as or otherwise support a means for selecting a first beam from the first set of multiple beams based on one or more parameters associated with the first beam. In some examples, to support selecting the second beam set from the set of multiple beam sets, the beam set manager 635 may be configured as or otherwise support a means for selecting a second beam from the second set of multiple beams based on one or more parameters associated with the second beam, where the second beam set includes the first beam and the second beam.

In some examples, to support selecting the first beam and the second beam, the beam set manager 635 may be configured as or otherwise support a means for selecting the first beam based on the one or more parameters associated with the first beam satisfying a first threshold. In some examples, to support selecting the first beam and the second beam, the beam set manager 635 may be configured as or otherwise support a means for selecting the second beam based on the one or more parameters associated with the second beam satisfying the first threshold, a second threshold, or both.

In some examples, to support selecting the first beam and the second beam, the beam set manager 635 may be configured as or otherwise support a means for selecting the first beam based on the first beam having a highest quality out of each beam of the first set of multiple beams. In some examples, to support selecting the first beam and the second beam, the beam set manager 635 may be configured as or otherwise support a means for selecting the second beam based on the second beam having a highest quality out of each beam of the second set of multiple beams.

In some examples, the one or more parameters associated with the first beam, the one or more parameters associated with the second beam, or both, include an RSRP measurement, an RSRQ measurement, an SNR, or any combination thereof.

In some examples, the reference signal receiving manager 630 may be configured as or otherwise support a means for performing measurements for the set of multiple reference signals received in the set of multiple time intervals, where the selecting is based on the measurements.

In some examples, the base station communicating manager 625 may be configured as or otherwise support a means for determining a quality of communications performed using the second beam set is less than or equal to a threshold quality. In some examples, the beam set manager 635 may be configured as or otherwise support a means for selecting a third beam set from the set of multiple beam sets based on the quality of communications performed using the second beam set being less than or equal to the threshold quality. In some examples, the base station communicating manager 625 may be configured as or otherwise support a means for communicating with the base station using the third beam set.

In some examples, to support communicating with the base station using the second beam set, the uplink message manager 645 may be configured as or otherwise support a means for transmitting an uplink message to the base station using the second beam set.

In some examples, to support communicating with the base station using the second beam set, the downlink message manager 650 may be configured as or otherwise support a means for receiving a downlink message from the base station using the second beam set.

In some examples, the first polarization includes a vertical polarization and the second polarization includes a horizontal polarization.

In some cases, the base station communicating manager 625, the reference signal receiving manager 630, the beam set manager 635, the reporting message transmitting manager 640, the uplink message manager 645, the downlink message manager 650, or any combination thereof, may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of base station communicating manager 525, the reference signal receiving manager 530, the beam set manager 535, or any combination thereof, as discussed herein.

Figure 7:
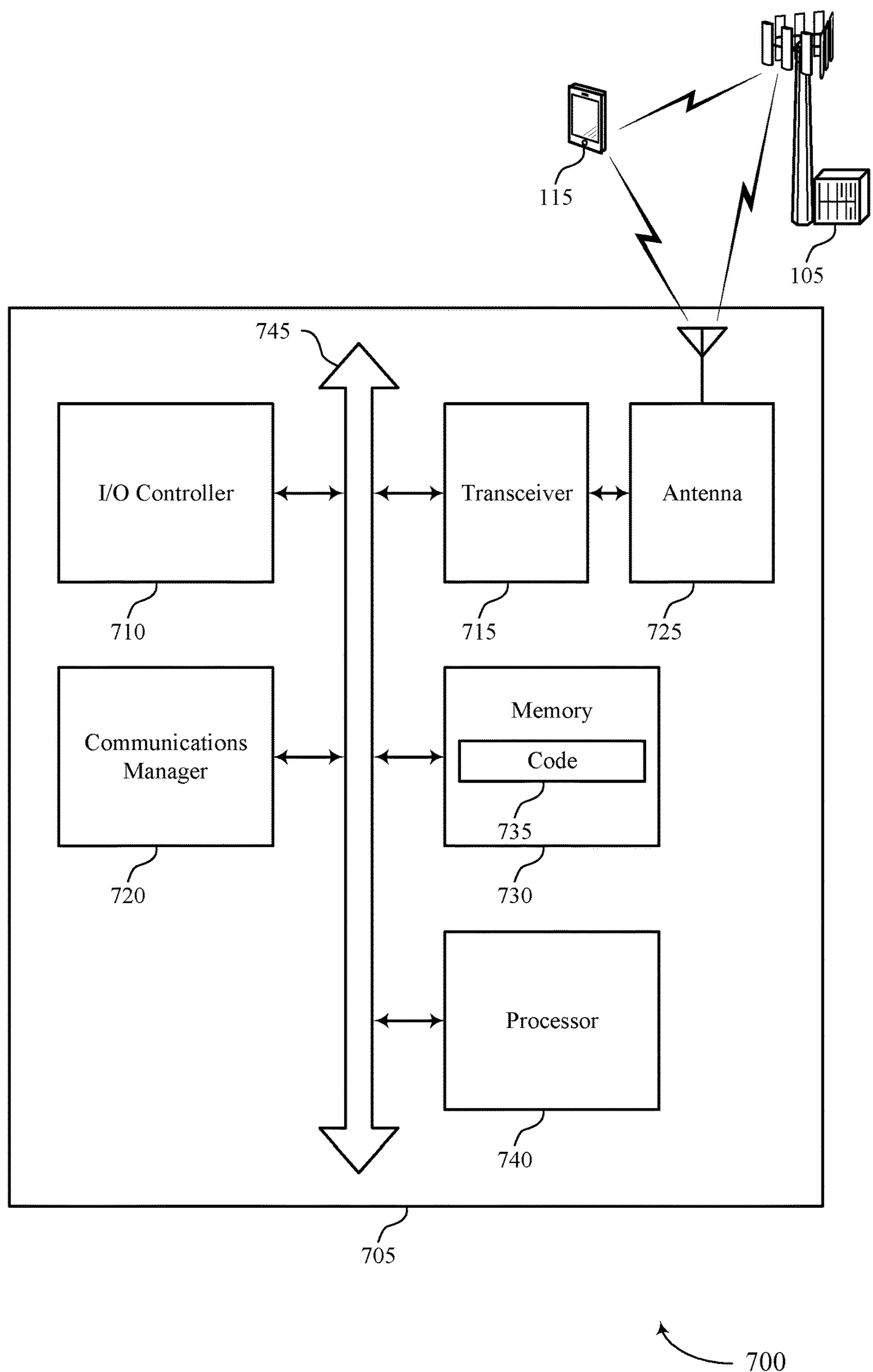
FIG. 7 shows a diagram of a system including a device that supports techniques for dynamically pairing beams in accordance with aspects of the present disclosure.

FIG. 7 shows a diagram of a system 700 including a device 705 that supports techniques for dynamically pairing beams in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for dynamically pairing beams). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for communicating with a base station using a first beam set of a set of multiple beam sets of the UE, each beam set of the set of multiple beam sets including a beam from a first set of multiple beams associated with a first polarization and a beam from a second set of multiple beams associated with a second polarization different than the first polarization. The communications manager 720 may be configured as or otherwise support a means for receiving a set of multiple reference signals in a set of multiple time intervals corresponding to a set of multiple transmit beams of the base station, where, for each beam of the first set of multiple beams and the second set of multiple beams, the UE receives at least one reference signal of the set of multiple reference signals in a time interval of the set of multiple time intervals. The communications manager 720 may be configured as or otherwise support a means for selecting a second beam set from the set of multiple beam sets based on one or more parameters associated with the second beam set and based on receiving the set of multiple reference signals. The communications manager 720 may be configured as or otherwise support a means for communicating with the base station using the selected second beam set.

By including or configuring the communications manager 720 in accordance with examples as described herein, the device 705 may support techniques for dynamically selecting beam sets (e.g., beam pairs) including two or more beams with different polarizations. Enabling UEs 115 to dynamically select individual beams for each beam set (e.g., each beam pair) may reduce a performance imbalance between beams of different polarizations (e.g., horizontally-polarized beams, vertically-polarized beams) within each beam set, which may improve a throughput and reliability of rank-2 and higher-rank communications (e.g., rank-4 communications). Moreover, by reducing performance imbalance and improving a throughput of beam sets at a UE 115, techniques described herein may reduce a quantity of retransmissions performed by the UE 115, as well as reduce a transmission power of transmissions performed by the UE 115, thereby reducing power consumption and improving battery performance at the UE 115.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for dynamically pairing beams as described herein, or the processor 740 and the memory 730 may be otherwise configured to perform or support such operations.

Figure 8:
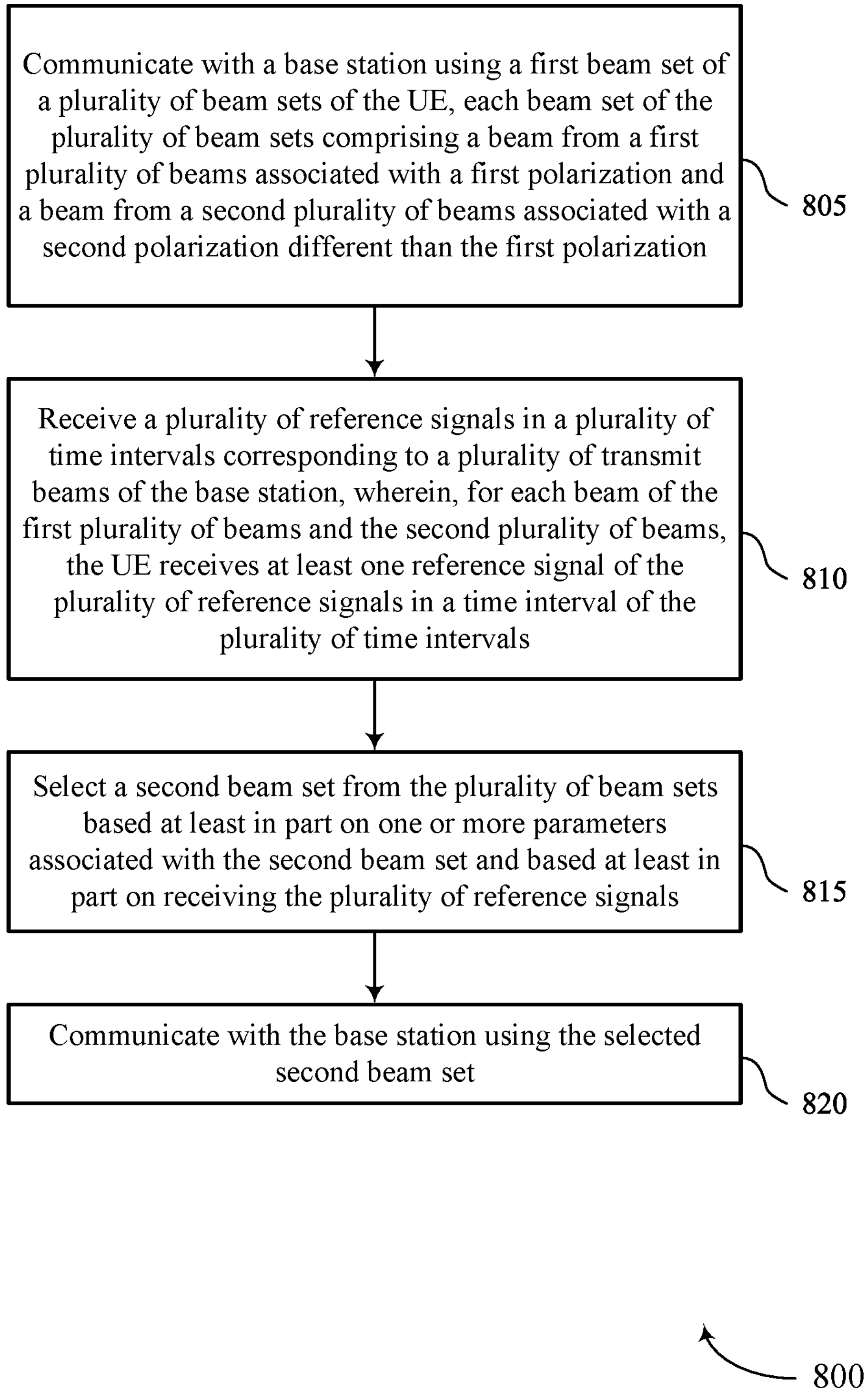
FIGS. 8 through 10 show flowcharts illustrating methods that support techniques for dynamically pairing beams in accordance with aspects of the present disclosure.

FIG. 8 shows a flowchart illustrating a method 800 that supports techniques for dynamically pairing beams in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 805, the method may include communicating with a base station using a first beam set of a set of multiple beam sets of the UE, each beam set of the set of multiple beam sets including a beam from a first set of multiple beams associated with a first polarization and a beam from a second set of multiple beams associated with a second polarization different than the first polarization. The operations of 805 may be performed in accordance with examples as disclosed herein. In some examples, aspects of the operations of 805 may be performed by a base station communicating manager 625 as described with reference to FIG. 6.

At 810, the method may include receiving a set of multiple reference signals in a set of multiple time intervals corresponding to a set of multiple transmit beams of the base station, where, for each beam of the first set of multiple beams and the second set of multiple beams, the UE receives at least one reference signal of the set of multiple reference signals in a time interval of the set of multiple time intervals. The operations of 810 may be performed in accordance with examples as disclosed herein. In some examples, aspects of the operations of 810 may be performed by a reference signal receiving manager 630 as described with reference to FIG. 6.

At 815, the method may include selecting a second beam set from the set of multiple beam sets based on one or more parameters associated with the second beam set and based on receiving the set of multiple reference signals. The operations of 815 may be performed in accordance with examples as disclosed herein. In some examples, aspects of the operations of 815 may be performed by a beam set manager 635 as described with reference to FIG. 6.

At 820, the method may include communicating with the base station using the selected second beam set. The operations of 820 may be performed in accordance with examples as disclosed herein. In some examples, aspects of the operations of 820 may be performed by a base station communicating manager 625 as described with reference to FIG. 6.

Figure 9:
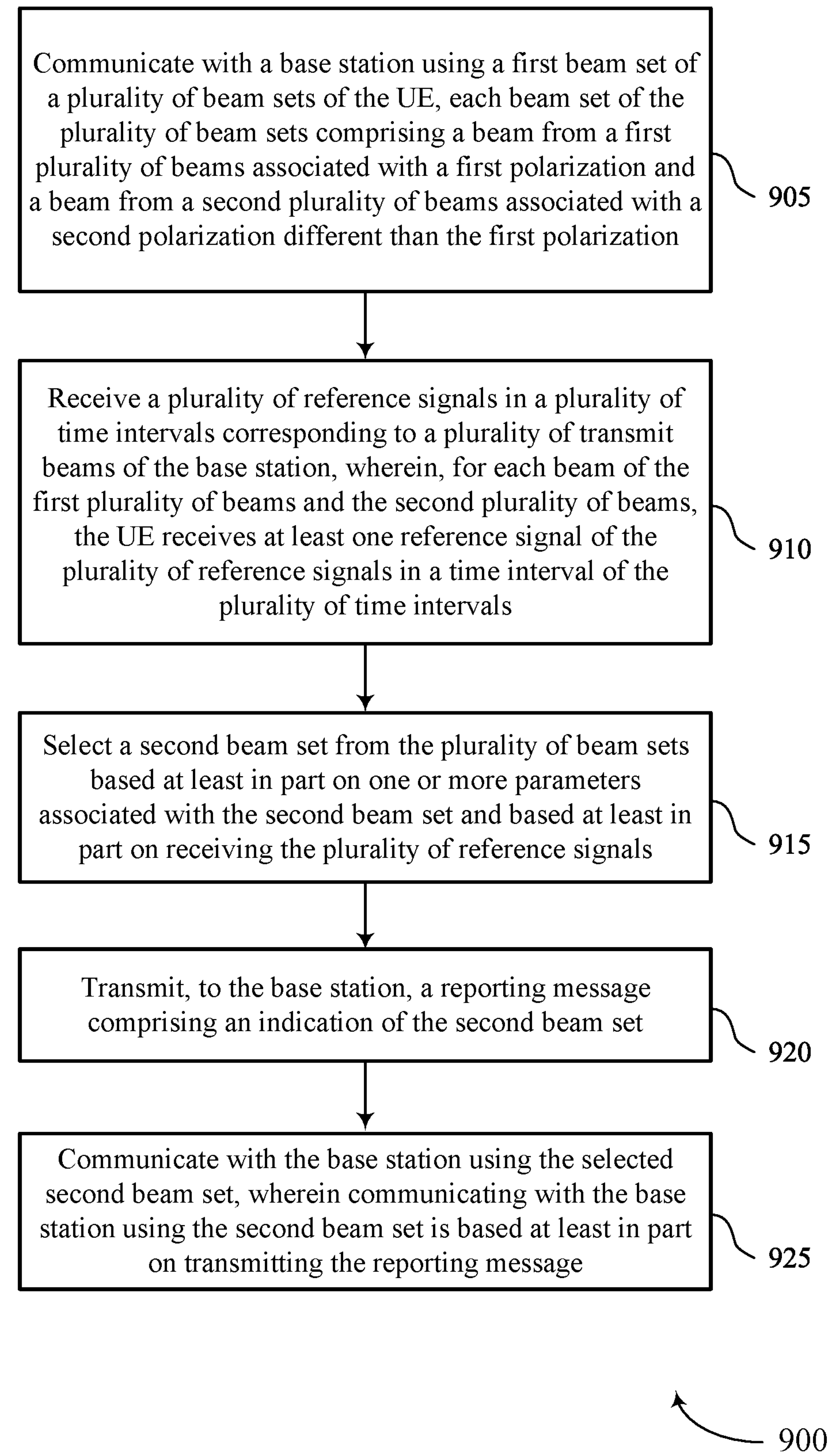

FIG. 9 shows a flowchart illustrating a method 900 that supports techniques for dynamically pairing beams in accordance with aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 905, the method may include communicating with a base station using a first beam set of a set of multiple beam sets of the UE, each beam set of the set of multiple beam sets including a beam from a first set of multiple beams associated with a first polarization and a beam from a second set of multiple beams associated with a second polarization different than the first polarization. The operations of 905 may be performed in accordance with examples as disclosed herein. In some examples, aspects of the operations of 905 may be performed by a base station communicating manager 625 as described with reference to FIG. 6.

At 910, the method may include receiving a set of multiple reference signals in a set of multiple time intervals corresponding to a set of multiple transmit beams of the base station, where, for each beam of the first set of multiple beams and the second set of multiple beams, the UE receives at least one reference signal of the set of multiple reference signals in a time interval of the set of multiple time intervals. The operations of 910 may be performed in accordance with examples as disclosed herein. In some examples, aspects of the operations of 910 may be performed by a reference signal receiving manager 630 as described with reference to FIG. 6.

At 915, the method may include selecting a second beam set from the set of multiple beam sets based on one or more parameters associated with the second beam set and based on receiving the set of multiple reference signals. The operations of 915 may be performed in accordance with examples as disclosed herein. In some examples, aspects of the operations of 915 may be performed by a beam set manager 635 as described with reference to FIG. 6.

At 920, the method may include transmitting, to the base station, a reporting message including an indication of the second beam set. The operations of 920 may be performed in accordance with examples as disclosed herein. In some examples, aspects of the operations of 920 may be performed by a reporting message transmitting manager 640 as described with reference to FIG. 6.

At 925, the method may include communicating with the base station using the selected second beam set, where communicating with the base station using the second beam set is based on transmitting the reporting message. The operations of 925 may be performed in accordance with examples as disclosed herein. In some examples, aspects of the operations of 925 may be performed by a base station communicating manager 625 as described with reference to FIG. 6.

Figure 10:
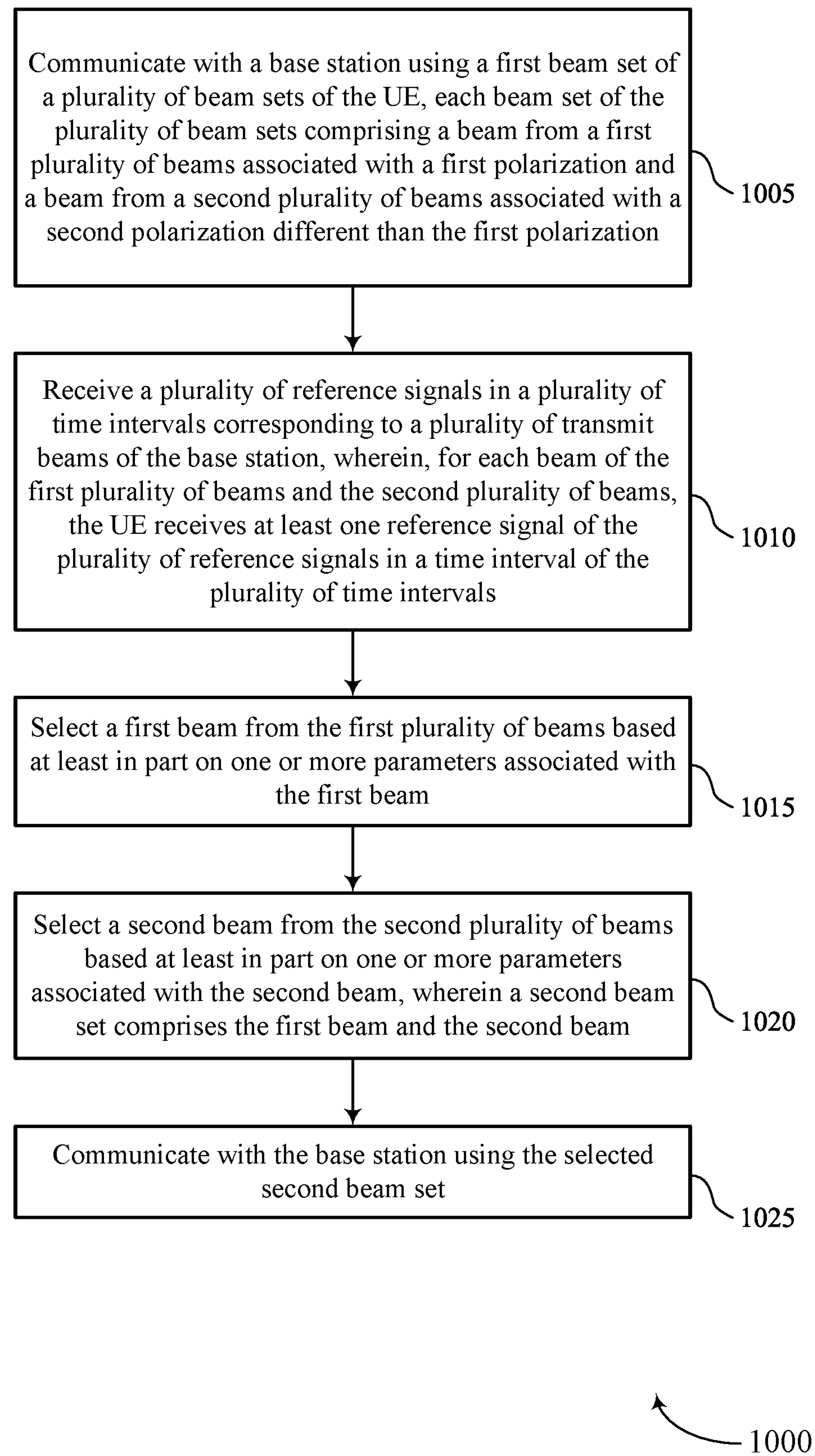

FIG. 10 shows a flowchart illustrating a method 1000 that supports techniques for dynamically pairing beams in accordance with aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1005, the method may include communicating with a base station using a first beam set of a set of multiple beam sets of the UE, each beam set of the set of multiple beam sets including a beam from a first set of multiple beams associated with a first polarization and a beam from a second set of multiple beams associated with a second polarization different than the first polarization. The operations of 1005 may be performed in accordance with examples as disclosed herein. In some examples, aspects of the operations of 1005 may be performed by a base station communicating manager 625 as described with reference to FIG. 6.

At 1010, the method may include receiving a set of multiple reference signals in a set of multiple time intervals corresponding to a set of multiple transmit beams of the base station, where, for each beam of the first set of multiple beams and the second set of multiple beams, the UE receives at least one reference signal of the set of multiple reference signals in a time interval of the set of multiple time intervals. The operations of 1010 may be performed in accordance with examples as disclosed herein. In some examples, aspects of the operations of 1010 may be performed by a reference signal receiving manager 630 as described with reference to FIG. 6.

At 1015, the method may include selecting a first beam from the first set of multiple beams based on one or more parameters associated with the first beam. The operations of 1015 may be performed in accordance with examples as disclosed herein. In some examples, aspects of the operations of 1015 may be performed by a beam set manager 635 as described with reference to FIG. 6.

At 1020, the method may include selecting a second beam from the second set of multiple beams based on one or more parameters associated with the second beam, where a second beam set includes the first beam and the second beam. The operations of 1020 may be performed in accordance with examples as disclosed herein. In some examples, aspects of the operations of 1020 may be performed by a beam set manager 635 as described with reference At 1025, the method may include communicating with the base station using the selected second beam set. The operations of 1025 may be performed in accordance with examples as disclosed herein. In some examples, aspects of the operations of 1025 may be performed by a base station communicating manager 625 as described with reference to FIG. 6.

The following provides an overview of aspects of the present disclosure:

Aspect 1: A method for wireless communication at a UE, comprising: communicating with a base station using a first beam set of a plurality of beam sets of the UE, each beam set of the plurality of beam sets comprising a beam from a first plurality of beams associated with a first polarization and a beam from a second plurality of beams associated with a second polarization different than the first polarization; receiving a plurality of reference signals in a plurality of time intervals corresponding to a plurality of transmit beams of the base station, wherein, for each beam of the first plurality of beams and the second plurality of beams, the UE receives at least one reference signal of the plurality of reference signals in a time interval of the plurality of time intervals; selecting a second beam set from the plurality of beam sets based at least in part on one or more parameters associated with the second beam set and based at least in part on receiving the plurality of reference signals; and communicating with the base station using the selected second beam set.

Aspect 2: The method of aspect 1, further comprising: transmitting, to the base station, a reporting message comprising an indication of the second beam set, wherein communicating with the base station using the second beam set is based at least in part on transmitting the reporting message.

Aspect 3: The method of any of aspects 1 through 2, wherein selecting the second beam set from the plurality of beam sets comprises: selecting a first beam from the first plurality of beams based at least in part on one or more parameters associated with the first beam; and selecting a second beam from the second plurality of beams based at least in part on one or more parameters associated with the second beam, wherein the second beam set comprises the first beam and the second beam.

Aspect 4: The method of aspect 3, wherein selecting the first beam and the second beam comprises: selecting the first beam based at least in part on the one or more parameters associated with the first beam satisfying a first threshold; and selecting the second beam based at least in part on the one or more parameters associated with the second beam satisfying the first threshold, a second threshold, or both.

Aspect 5: The method of any of aspects 3 through 4, wherein selecting the first beam and the second beam comprises: selecting the first beam based at least in part on the first beam having a highest quality out of each beam of the first plurality of beams; and selecting the second beam based at least in part on the second beam having a highest quality out of each beam of the second plurality of beams.

Aspect 6: The method of any of aspects 3 through 5, wherein the one or more parameters associated with the first beam, the one or more parameters associated with the second beam, or both, comprise an RSRP measurement, an RSRQ measurement, an SNR, or any combination thereof.

Aspect 7: The method of any of aspects 1 through 6, further comprising: performing measurements for the plurality of reference signals received in the plurality of time intervals, wherein the selecting is based at least in part on the measurements.

Aspect 8: The method of any of aspects 1 through 7, further comprising: determining a quality of communications performed using the second beam set is less than or equal to a threshold quality; selecting a third beam set from the plurality of beam sets based at least in part on the quality of communications performed using the second beam set being less than or equal to the threshold quality; and communicating with the base station using the third beam set.

Aspect 9: The method of any of aspects 1 through 8, wherein communicating with the base station using the second beam set comprises: transmitting an uplink message to the base station using the second beam set.

Aspect 10: The method of any of aspects 1 through 9, wherein communicating with the base station using the second beam set comprises: receiving a downlink message from the base station using the second beam set.

Aspect 11: The method of any of aspects 1 through 10, wherein the first polarization comprises a vertical polarization and the second polarization comprises a horizontal polarization.

Aspect 12: An apparatus for wireless communication at a UE, comprising a processor; memory coupled with the processor; and instructions stored in the memory and executable by the processor to cause the apparatus to perform a method of any of aspects 1 through 11.

Aspect 13: An apparatus for wireless communication at a UE, comprising at least one means for performing a method of any of aspects 1 through 11.

Aspect 14: A non-transitory computer-readable medium storing code for wireless communication at a UE, the code comprising instructions executable by a processor to perform a method of any of aspects 1 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

communicating with a base station using a first beam set of a plurality of beam sets of the UE, each beam set of the plurality of beam sets comprising a beam from a first plurality of beams associated with a first polarization and a beam from a second plurality of beams associated with a second polarization different than the first polarization;

receiving a plurality of reference signals in a plurality of time intervals corresponding to a plurality of transmit beams of the base station, wherein, for each beam of the first plurality of beams and the second plurality of beams, the UE receives at least one reference signal of the plurality of reference signals in a time interval of the plurality of time intervals;

selecting a second beam set from the plurality of beam sets based at least in part on one or more parameters associated with the second beam set and based at least in part on receiving the plurality of reference signals;

communicating with the base station using the selected second beam set;

determining a quality of communications performed using the second beam set is less than or equal to a threshold quality;

selecting a third beam set from the plurality of beam sets based at least in part on the quality of communications performed using the second beam set being less than or equal to the threshold quality; and communicating with the base station using the third beam set.

2. The method of claim 1, further comprising:

transmitting, to the base station, a reporting message comprising an indication of the second beam set, wherein communicating with the base station using the second beam set is based at least in part on transmitting the reporting message.

3. The method of claim 1, wherein selecting the second beam set from the plurality of beam sets comprises:

selecting a first beam from the first plurality of beams based at least in part on one or more parameters associated with the first beam; and selecting a second beam from the second plurality of beams based at least in part on one or more parameters associated with the second beam, wherein the second beam set comprises the first beam and the second beam.

4. The method of claim 3, wherein selecting the first beam and the second beam comprises:

selecting the first beam based at least in part on the one or more parameters associated with the first beam satisfying a first threshold; and selecting the second beam based at least in part on the one or more parameters associated with the second beam satisfying the first threshold, a second threshold, or both.

5. The method of claim 3, wherein selecting the first beam and the second beam comprises:

selecting the first beam based at least in part on the first beam having a highest quality out of each beam of the first plurality of beams; and selecting the second beam based at least in part on the second beam having a highest quality out of each beam of the second plurality of beams.

6. The method of claim 3, wherein the one or more parameters associated with the first beam, the one or more parameters associated with the second beam, or both, comprise a reference signal received power measurement, a reference signal received quality measurement, a signal-to-noise ratio, or any combination thereof.

7. The method of claim 1, further comprising:

performing measurements for the plurality of reference signals received in the plurality of time intervals, wherein the selecting is based at least in part on the measurements.

8. The method of claim 1, wherein communicating with the base station using the second beam set comprises:

transmitting an uplink message to the base station using the second beam set.

9. The method of claim 1, wherein communicating with the base station using the second beam set comprises:

receiving a downlink message from the base station using the second beam set.

10. The method of claim 1, wherein the first polarization comprises a vertical polarization and the second polarization comprises a horizontal polarization.

11. An apparatus for wireless communication at a user equipment (UE), comprising:

a processor;

memory coupled with the processor; and instructions stored in the memory and executable by the processor to cause the apparatus to:

communicate with a base station using a first beam set of a plurality of beam sets of the UE, each beam set of the plurality of beam sets comprising a beam from a first plurality of beams associated with a first polarization and a beam from a second plurality of beams associated with a second polarization different than the first polarization;

receive a plurality of reference signals in a plurality of time intervals corresponding to a plurality of transmit beams of the base station, wherein, for each beam of the first plurality of beams and the second plurality of beams, the UE receives at least one reference signal of the plurality of reference signals in a time interval of the plurality of time intervals;

select a second beam set from the plurality of beam sets based at least in part on one or more parameters associated with the second beam set and based at least in part on receiving the plurality of reference signals;

communicate with the base station using the selected second beam set;

determine a quality of communications performed using the second beam set is less than or equal to a threshold quality;

select a third beam set from the plurality of beam sets based at least in part on the quality of communications performed using the second beam set being less than or equal to the threshold quality; and communicate with the base station using the third beam set.

12. The apparatus of claim 11, wherein the instructions are further executable by the processor to cause the apparatus to:

transmit, to the base station, a reporting message comprising an indication of the second beam set, wherein communicating with the base station using the second beam set is based at least in part on transmitting the reporting message.

13. The apparatus of claim 11, wherein the instructions to select the second beam set from the plurality of beam sets are executable by the processor to cause the apparatus to:

select a first beam from the first plurality of beams based at least in part on one or more parameters associated with the first beam; and select a second beam from the second plurality of beams based at least in part on one or more parameters associated with the second beam, wherein the second beam set comprises the first beam and the second beam.

14. The apparatus of claim 13, wherein the instructions to select the first beam and the second beam are executable by the processor to cause the apparatus to:

select the first beam based at least in part on the one or more parameters associated with the first beam satisfying a first threshold; and select the second beam based at least in part on the one or more parameters associated with the second beam satisfying the first threshold, a second threshold, or both.

15. The apparatus of claim 13, wherein the instructions to select the first beam and the second beam are executable by the processor to cause the apparatus to:

select the first beam based at least in part on the first beam having a highest quality out of each beam of the first plurality of beams; and select the second beam based at least in part on the second beam having a highest quality out of each beam of the second plurality of beams.

16. The apparatus of claim 13, wherein the one or more parameters associated with the first beam, the one or more parameters associated with the second beam, or both, comprise a reference signal received power measurement, a reference signal received quality measurement, a signal-to-noise ratio, or any combination thereof.

17. The apparatus of claim 11, wherein the instructions are further executable by the processor to cause the apparatus to:

perform measurements for the plurality of reference signals received in the plurality of time intervals, wherein the selecting is based at least in part on the measurements.

18. The apparatus of claim 11, wherein the instructions to communicate with the base station using the second beam set are executable by the processor to cause the apparatus to:

transmit an uplink message to the base station using the second beam set.

19. The apparatus of claim 11, wherein the instructions to communicate with the base station using the second beam set are executable by the processor to cause the apparatus to:

receive a downlink message from the base station using the second beam set.

20. The apparatus of claim 11, wherein the first polarization comprises a vertical polarization and the second polarization comprises a horizontal polarization.

21. An apparatus for wireless communication at a user equipment (UE), comprising:

means for communicating with a base station using a first beam set of a plurality of beam sets of the UE, each beam set of the plurality of beam sets comprising a beam from a first plurality of beams associated with a first polarization and a beam from a second plurality of beams associated with a second polarization different than the first polarization;

means for receiving a plurality of reference signals in a plurality of time intervals corresponding to a plurality of transmit beams of the base station, wherein, for each beam of the first plurality of beams and the second plurality of beams, the UE receives at least one reference signal of the plurality of reference signals in a time interval of the plurality of time intervals;

means for selecting a second beam set from the plurality of beam sets based at least in part on one or more parameters associated with the second beam set and based at least in part on receiving the plurality of reference signals;

means for communicating with the base station using the selected second beam set;

means for determining a quality of communications performed using the second beam set is less than or equal to a threshold quality;

means for selecting a third beam set from the plurality of beam sets based at least in part on the quality of communications performed using the second beam set being less than or equal to the threshold quality; and means for communicating with the base station using the third beam set.

22. The apparatus of claim 21, further comprising:

means for transmitting, to the base station, a reporting message comprising an indication of the second beam set, wherein communicating with the base station using the second beam set is based at least in part on transmitting the reporting message.

23. The apparatus of claim 21, wherein the means for selecting the second beam set from the plurality of beam sets comprise:

means for selecting a first beam from the first plurality of beams based at least in part on one or more parameters associated with the first beam; and means for selecting a second beam from the second plurality of beams based at least in part on one or more parameters associated with the second beam, wherein the second beam set comprises the first beam and the second beam.

24. The apparatus of claim 23, wherein the means for selecting the first beam and the second beam comprise:

means for selecting the first beam based at least in part on the one or more parameters associated with the first beam satisfying a first threshold; and means for selecting the second beam based at least in part on the one or more parameters associated with the second beam satisfying the first threshold, a second threshold, or both.

25. The apparatus of claim 23, wherein the means for selecting the first beam and the second beam comprise:

means for selecting the first beam based at least in part on the first beam having a highest quality out of each beam of the first plurality of beams; and means for selecting the second beam based at least in part on the second beam having a highest quality out of each beam of the second plurality of beams.

26. The apparatus of claim 23, wherein:

the one or more parameters associated with the first beam, the one or more parameters associated with the second beam, or both, comprise a reference signal received power measurement, a reference signal received quality measurement, a signal-to-noise ratio, or any combination thereof.

27. The apparatus of claim 21, further comprising:

means for performing measurements for the plurality of reference signals received in the plurality of time intervals, wherein the selecting is based at least in part on the measurements.

28. A non-transitory computer-readable medium storing code for wireless communication at a user equipment (UE), the code comprising instructions executable by a processor to:

communicate with a base station using a first beam set of a plurality of beam sets of the UE, each beam set of the plurality of beam sets comprising a beam from a first plurality of beams associated with a first polarization and a beam from a second plurality of beams associated with a second polarization different than the first polarization;

receive a plurality of reference signals in a plurality of time intervals corresponding to a plurality of transmit beams of the base station, wherein, for each beam of the first plurality of beams and the second plurality of beams, the UE receives at least one reference signal of the plurality of reference signals in a time interval of the plurality of time intervals;

select a second beam set from the plurality of beam sets based at least in part on one or more parameters associated with the second beam set and based at least in part on receiving the plurality of reference signals;

communicate with the base station using the selected second beam set;

determine a quality of communications performed using the second beam set is less than or equal to a threshold quality;

select a third beam set from the plurality of beam sets based at least in part on the quality of communications performed using the second beam set being less than or equal to the threshold quality; and communicate with the base station using the third beam set.

* * * * *